(12) United States Patent
Wang et al.

(10) Patent No.: US 12,007,625 B2
(45) Date of Patent: Jun. 11, 2024

(54) GLASSES

(71) Applicant: SHENZHEN SHOKZ CO., LTD., Guangdong (CN)

(72) Inventors: Yueqiang Wang, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 724 days.

(21) Appl. No.: 17/137,373

(22) Filed: Dec. 30, 2020

(65) Prior Publication Data

US 2021/0116724 A1 Apr. 22, 2021

Related U.S. Application Data

(63) Continuation of application No. PCT/CN2019/102385, filed on Aug. 24, 2019.

(30) Foreign Application Priority Data

Aug. 24, 2018 (CN) .......................... 201810975515.1

(51) Int. Cl.
*G02C 11/00* (2006.01)
*G02C 5/00* (2006.01)
(Continued)

(52) U.S. Cl.
CPC .............. *G02C 11/10* (2013.01); *G02C 5/001* (2013.01); *G02C 5/143* (2013.01); *G02C 5/16* (2013.01);
(Continued)

(58) Field of Classification Search
None
See application file for complete search history.

(56) References Cited

U.S. PATENT DOCUMENTS

| 2,327,320 | A | 8/1943 | Shapiro |
| 4,902,120 | A | 2/1990 | Weyer |

(Continued)

FOREIGN PATENT DOCUMENTS

| CN | 2639920 Y | 9/2004 |
| CN | 102141688 A | 8/2011 |

(Continued)

OTHER PUBLICATIONS

The Extended European Search Report in European Application No. 14877111.6 dated Mar. 17, 2017, 6 pages.

(Continued)

*Primary Examiner* — Darryl J Collins
(74) *Attorney, Agent, or Firm* — METIS IP LLC

(57) ABSTRACT

The present disclosure embodiment may disclose glasses. The glasses may include a glasses frame and two speakers. The glasses frame may include a glasses rim and two glasses temples. The two glasses temples may be rotatably connected to the glasses rim, respectively. The two speakers may include an earphone core, respectively. The two speakers may be connected to the two glasses temples via hinge components of the two glasses temples, respectively. The hinge components may be rotatable to change a position of each of the speakers relative to connected one of the glasses temples to make the speaker abut in front of or behind ears of a user. The glasses temple may include a control circuit or a battery to drive the earphone core to vibrate to generate a sound.

19 Claims, 20 Drawing Sheets

(51) Int. Cl.
  *G02C 5/14*   (2006.01)
  *G02C 5/16*   (2006.01)
  *G02C 5/22*   (2006.01)
  *H04R 1/02*   (2006.01)
  *H04R 1/10*   (2006.01)
  *H04R 5/033*  (2006.01)
  *H04R 9/02*   (2006.01)
  *H04R 9/04*   (2006.01)
  *H04R 9/06*   (2006.01)
  *G02C 5/20*   (2006.01)

(52) U.S. Cl.
  CPC ......... *G02C 5/2218* (2013.01); *G02C 5/2227* (2013.01); *G02C 5/2254* (2013.01); *H04R 1/025* (2013.01); *H04R 1/028* (2013.01); *H04R 1/1008* (2013.01); *H04R 1/1066* (2013.01); *H04R 5/0335* (2013.01); *H04R 9/025* (2013.01); *H04R 9/045* (2013.01); *H04R 9/06* (2013.01); *G02C 5/20* (2013.01); *H04R 2400/03* (2013.01); *H04R 2460/13* (2013.01); *H04R 2499/10* (2013.01)

(56) References Cited

U.S. PATENT DOCUMENTS

| | | | |
|---|---|---|---|
| 5,335,285 A * | 8/1994 | Gluz | H04R 1/1066 |
| | | | 381/381 |
| 5,606,743 A * | 2/1997 | Vogt | H04B 1/086 |
| | | | 351/158 |
| 6,409,338 B1 * | 6/2002 | Jewell | G02C 11/10 |
| | | | 351/158 |
| 6,850,138 B1 | 2/2005 | Sakai | |
| 7,289,767 B2 | 10/2007 | Lai | |
| 2003/0048913 A1 | 3/2003 | Lee et al. | |
| 2005/0136977 A1 * | 6/2005 | Levy | G02C 11/10 |
| | | | 455/557 |
| 2006/0158608 A1 * | 7/2006 | Lin | G02C 11/10 |
| | | | 351/158 |
| 2008/0013041 A1 * | 1/2008 | Chou | G02C 11/06 |
| | | | 351/158 |
| 2008/0074609 A1 | 3/2008 | Ifergan | |
| 2009/0208031 A1 | 8/2009 | Abolfathi | |
| 2009/0290730 A1 | 11/2009 | Fukuda et al. | |
| 2010/0322454 A1 | 12/2010 | Ambrose et al. | |
| 2011/0170054 A1 * | 7/2011 | Jackson | G02C 11/10 |
| | | | 351/158 |
| 2011/0200204 A1 | 8/2011 | Horigome et al. | |
| 2012/0105740 A1 * | 5/2012 | Jannard | G06F 3/16 |
| | | | 351/158 |
| 2012/0328134 A1 * | 12/2012 | Lewis | G02C 11/10 |
| | | | 381/386 |
| 2014/0253867 A1 * | 9/2014 | Jiang | G02C 11/10 |
| | | | 351/158 |
| 2015/0030189 A1 | 1/2015 | Nabata et al. | |
| 2015/0256656 A1 | 9/2015 | Horii | |
| 2015/0257662 A1 | 9/2015 | Lee et al. | |
| 2015/0326967 A1 | 11/2015 | Otani | |
| 2016/0234613 A1 | 8/2016 | Westerkull | |
| 2016/0246076 A1 | 8/2016 | Wei | |
| 2016/0261956 A1 * | 9/2016 | Collini | H04R 1/028 |
| 2017/0090201 A1 | 3/2017 | Guo | |
| 2019/0113774 A1 * | 4/2019 | Anderson | G02B 27/017 |
| 2020/0336824 A1 | 10/2020 | Zheng et al. | |
| 2020/0344542 A1 | 10/2020 | Liu et al. | |

FOREIGN PATENT DOCUMENTS

| | | | |
|---|---|---|---|
| CN | 201984240 U | 9/2011 |
| CN | 202306037 U | 7/2012 |
| CN | 202364340 U | 8/2012 |
| CN | 103167390 A | 6/2013 |
| CN | 203786416 U | 8/2014 |
| CN | 204374548 U | 6/2015 |
| CN | 105007551 A | 10/2015 |
| CN | 204887455 U | 12/2015 |
| CN | 205103503 U | 3/2016 |
| CN | 205301727 U | 6/2016 |
| CN | 205720956 U | 11/2016 |
| CN | 205793159 U | 12/2016 |
| CN | 205961389 U | 2/2017 |
| CN | 206061075 U | 3/2017 |
| CN | 206292473 U | 6/2017 |
| CN | 106937221 A | 7/2017 |
| CN | 106954150 A | 7/2017 |
| CN | 106954151 A | 7/2017 |
| CN | 106954153 A | 7/2017 |
| CN | 106974645 A | 7/2017 |
| CN | 206365029 U | 7/2017 |
| CN | 106997107 A | 8/2017 |
| CN | 206387972 U | 8/2017 |
| CN | 206421112 U | 8/2017 |
| CN | 206563855 U | 10/2017 |
| CN | 206640748 U | 11/2017 |
| CN | 206920741 U | 1/2018 |
| CN | 107948881 A | 4/2018 |
| CN | 207424414 U | 5/2018 |
| CN | 207443120 U | 6/2018 |
| CN | 108391188 A | 8/2018 |
| CN | 207718105 U | 8/2018 |
| CN | 207720370 U | 8/2018 |
| CN | 108600920 A | 9/2018 |
| CN | 108776393 A | 11/2018 |
| CN | 108845436 A | 11/2018 |
| CN | 108873372 A | 11/2018 |
| CN | 109061902 A | 12/2018 |
| CN | 109495809 A | 3/2019 |
| CN | 208780924 U | 4/2019 |
| CN | 208780925 U | 4/2019 |
| CN | 208780926 U | 4/2019 |
| CN | 208780932 U | 4/2019 |
| CN | 208847977 U | 5/2019 |
| CN | 208847981 U | 5/2019 |
| CN | 110022516 A | 7/2019 |
| CN | 209184747 U | 7/2019 |
| CN | 209267805 U | 8/2019 |
| EP | 2011367 B1 | 12/2014 |
| JP | S59161928 A | 9/1984 |
| JP | 2006157318 A | 6/2006 |
| JP | 2006332715 A | 12/2006 |
| JP | 2007251358 A | 9/2007 |
| JP | 2013055571 A | 3/2013 |
| JP | 2014072555 A | 4/2014 |
| WO | 9623373 A1 | 8/1996 |
| WO | 2004095878 A2 | 11/2004 |
| WO | 2006023341 A2 | 3/2006 |
| WO | 2007070508 A2 | 6/2007 |
| WO | 2007133055 A1 | 11/2007 |
| WO | 2015115693 A1 | 8/2015 |

OTHER PUBLICATIONS

The Communication Pursuant to Article 94(3) EPC in European Application No. 14877111.6 dated Apr. 23, 2018, 6 pages.
First Examination Report in Indian Application No. 201617026062 dated Nov. 13, 2020, 6 pages.
Notice of Reasons for Rejection in Japanese Application No. 2016-545828 dated Oct. 10, 2017, 6 pages.
Decision to Grant a Patent in Japanese Application No. 2016-545828 dated Jan. 16, 2018, 5 pages.
Decision of Patent Grant in Korea Application No. 10-2016-7017110 dated Jun. 14, 2018, 3 pages.
International Search Report in PCT/CN2019/102394 dated Nov. 28, 2019, 8 pages.
International Search Report in PCT/CN2019/102377 dated Dec. 3, 2019, 8 pages.
International Search Report in PCT/CN2019/102378 dated Nov. 6, 2019, 8 pages.
International Search Report in PCT/CN2019/102385 dated Nov. 18, 2019, 6 pages.

(56) References Cited

OTHER PUBLICATIONS

International Search Report in PCT/CN2019/102389 dated Nov. 28, 2019, 8 pages.
International Search Report in PCT/CN2019/102396 dated Nov. 27, 2019, 8 pages.
International Search Report in PCT/CN2019/102395 dated Nov. 27, 2019, 9 pages.
International Search Report in PCT/CN2019/102406 dated Nov. 26, 2019, 7 pages.
International Search Report in PCT/CN2019/102407 dated Nov. 8, 2019, 6 pages.
International Search Report in PCT/CN2019/102408 dated Nov. 6, 2019, 6 pages.
International Search Report in PCT/CN2019/102398 dated Oct. 31, 2019, 6 pages.
International Search Report in PCT/CN2019/102386 dated Nov. 25, 2019, 7 pages.
International Search Report in PCT/CN2019/102390 dated Nov. 22, 2019, 8 pages.
International Search Report in PCT/CN2019/102391 dated Nov. 22, 2019, 8 pages.
First Office Action in Chinese Application No. 201810975515.1 dated Apr. 13, 2023, 23 pages.

* cited by examiner

GLASSES

CROSS-REFERENCE TO RELATED APPLICATION

This application is a continuation of International Application No. PCT/CN2019/102385, filed on Aug. 24, 2019, which claims priority of Chinese Patent Application No. 201810975515.1 filed on Aug. 24, 2018, the entire contents of each of which are hereby incorporated by reference in their entirety.

TECHNICAL FIELD

The present disclosure relates to the field of glasses, and more specifically relates to glasses having a hinge component.

BACKGROUND

People often wear glasses in daily life, such as short-sighted glasses, far-sighted glasses, sunglasses, virtual reality (VR) glasses, massage glasses, etc. However, these glasses have a single function and cannot meet multiple requirements of people at the same time. For example, people often wear sunglasses when going out for sports or traveling. However, if they want to listen to music at the same time, they need to prepare additional earphones, which is not convenient to carry and store. Therefore, glasses with an earphone function bring great convenience to users.

SUMMARY

An embodiment of the present disclosure may provide glasses. The glasses may include a glasses frame and two speakers. The glasses frame may include a glasses rim and two glasses temples. The two glasses temples may be rotatably connected to the glasses rim, respectively. The two speakers may include an earphone core, respectively. The two speakers may be connected to the two glasses temples via hinge components of the two glasses temples, respectively. The hinge components may be rotatable to change a position of each of the speakers relative to connected one of the glasses temples to make the speaker abut in front of or behind ears of a user. The glasses temple may accommodate a circuit or a battery to drive the earphone core to vibrate to generate a sound.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
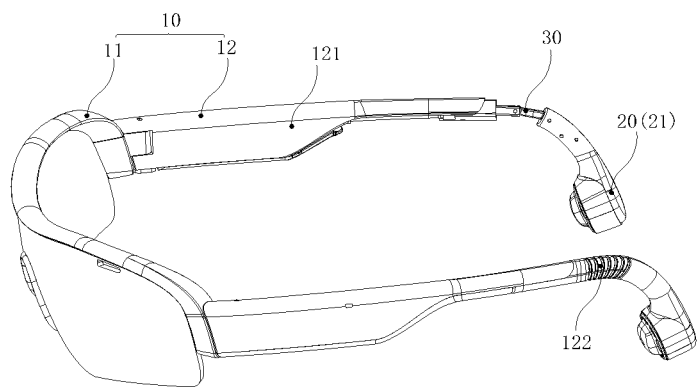
FIG. 1 is a schematic structural diagram illustrating glasses according to some embodiments of the present disclosure.

In order to illustrate the technical solutions related to the embodiments of the present disclosure, the drawings used to describe the embodiments are briefly introduced below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, the "glasses" or "sunglasses" described in the present disclosure means "glasses" or "sunglasses" with a speaker. For those skilled in the art, "glasses" or "sunglasses" may also be replaced with other similar words, such as "eye protection device," "eye wearable device," or the like. In fact, the various implementations in the present disclosure may be easily applied to hearing devices other than the speaker. For example, for those skilled in the art, after understanding the basic principles of speaker, it is possible to make various modifications and changes in the form and details of the specific methods and steps for implementing the speaker without departing from this principle. In particular, an environmental sound collection and processing function may be added to the speaker to enable the speaker to implement the function of a hearing aid. For example, a microphone may collect environmental sounds of a useriwearer, process the sounds using an algorithm and transmit the processed sound (or generated electrical signal) to a speaker of glasses. That is, the glasses may be modified to include the function of collecting the environmental sounds, and after a signal processing, the sound may be transmitted to the user/wearer via the speaker, thereby implementing the function of the hearing aid. As an example, the algorithm mentioned herein may include noise cancellation, automatic gain control, acoustic feedback suppression, wide dynamic range compression, active environment recognition, active noise reduction, directional processing, tinnitus processing, mufti-channel wide dynamic range compression, active howling suppression, volume control, or the like, or any combination thereof.

When describing the relevant technologies in the present disclosure, the description of "speaker" or "speaker assembly" may be used. The description is only one form of an application of the speaker. For those skilled in the art, "speaker" or "speaker assembly may also be replaced by other similar words, such as "speaker component," "earphone," speaker mechanism," etc. In some embodiments, the speaker may be integrated into the glasses to enable the glasses to paly a sound.

Referring to FIG. 1, FIG. 1 is a schematic structural diagram illustrating glasses according to an embodiment of the present disclosure. In the embodiment, the glasses may include a glasses frame 10 and a function member 20.

In some embodiments, the glasses frame 10 in the present disclosure may include glasses frames of various glasses such as short-sighted glasses, far-sighted glasses, sunglasses, 3D glasses, etc., and be not limited herein.

The function member 20 may be connected to the glasses frame 10 so that the glasses may further have some other functional modules or components. For example, the function member 20 may include a speaker including a bone conduction speaker, an air conduction speaker, or the like. Specifically, the function member 20 may be a bone conduction speaker 21 to further make the glasses have a function of the bone conduction speaker 21. Of course, the function member 20 may also include other components, such as a positioning device, and may be not limited herein.

In some embodiments, the glasses frame 10 may include a glasses rim 11 and two glasses temples 12. The glasses temple 12 may include a main body 121 of the glasses temple and a hinge component 122. The main body 121 may be rotatably connected to the glasses rim 11. The speaker 21 may be connected to the glasses temple 12 via the hinge component 122.

Figure 2:
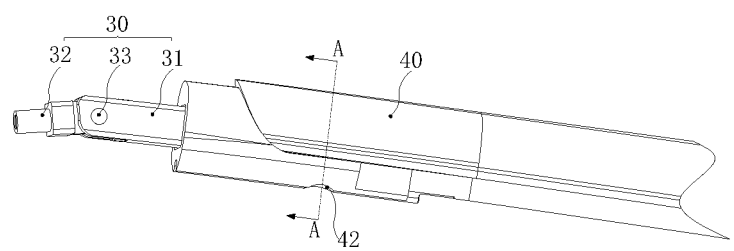
FIG. 2 is a schematic structural diagram illustrating a hinge component according to some embodiments of the present disclosure.
Figure 3:
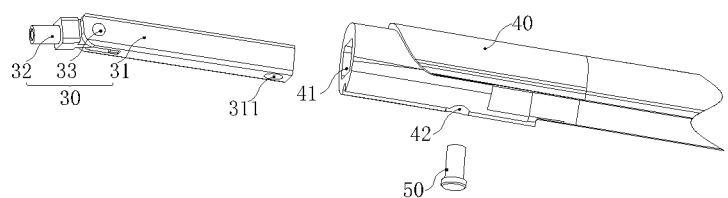
FIG. 3 is a schematic diagram illustrating an explosion structure according to some embodiments of the present disclosure.

FIG. 2 is a schematic structural diagram illustrating a hinge component according to an embodiment of the present disclosure. FIG. 3 is a schematic diagram illustrating an explosion structure of a hinge component according to an embodiment of the present disclosure. In some embodiments, the hinge component 122 of the present disclosure may be used in glasses in some embodiment of the present disclosure.

In the present disclosure, the hinge component 122 may include a hinge 30. The hinge 30 may be a structure used to connect two solids and allow a relative rotation between the two solids.

Specifically, when the hinge component 122 in the embodiment is used in the embodiment of the glasses described above, the hinge component 122 may be disposed at an end of the main body 121 of the glasses temple away from the glasses rim 11. The function member 20 may further be connected to the end of the main body 121 of the glasses temple away from the glasses rim 11 via the hinge 30.

In some embodiments, the hinge component 122 may also include a rod-shaped member 40 and a fixing member 50. In some embodiments, the hinge 30 may include a hinge mount 31 and a hinge arm 32. In some embodiments, the hinge arm 32 may be rotatably connected to the hinge mount 31 via a rotating shaft 33. It is easily understood that the hinge mount 31 and the hinge arm 32 may be respectively connected to two members that need to be rotatably connected. Therefore, the two members may be rotatably connected together via the rotating shaft 33 of the hinge 30.

In some embodiments, the hinge mount 31 of the hinge 30 may be connected to the rod-shaped member 40. In some embodiments, the rod-shaped member 40 may be a partial structure or an integral structure of one of the two members that are rotatably connected via the hinge 30. Alternatively, the rod-shaped member 40 may be a connection structure that connects one of the two members that need to be rotatably connected to the hinge 30. When the hinge component 122 in the embodiment is used for the glasses, the rod-shaped member 40 may be at least a portion of the main body 121 of the glasses temple of the glasses. For example, the rod-shaped member 40 may be the entirety of the main body 121 of the glasses temple. Alternatively, the rod-shaped member 40 may be a portion of an end of the main body 121 of the glasses temple away from the glasses rim 11. The hinge 30 may be disposed at the end of the main body 121 of the glasses temple away from the glasses rim 11 via the portion of the main body 121 of the glasses temple.

Specifically, the rod-shaped member 40 may be provided with a hinge chamber 41 connected to an end surface of the rod-shaped member 40 along the length direction. A side wall of the rod-shaped member 40 may be provided with a first insertion hole 42 communicating with the hinge chamber 41. The end of the hinge mount 31 away from the hinge arm 32 may be inserted into the hinge chamber 41 from the end surface of the rod-shaped member 40, and fixed in the hinge chamber 41 via a fixing member 50 inserted in the first insertion hole 42.

In the embodiment, the hinge chamber 41 may communicate with the end surface of the main body 121 of the glasses temple away from the end of the glasses rim 11. Therefore, the hinge mount 31 is inserted into the hinge chamber 41 and the hinge 30 is connected to the main body 121 of the glasses temple.

In some embodiments, the hinge chamber 41 may be formed during a molding process of the rod-shaped member 40. For example, the material of the rod-shaped member 40 may be rubber or plastic. At this time, the hinge chamber 41 may be formed by injection molding. The shape of the hinge chamber 41 may match the hinge mount 31 so that the hinge mount 31 may be accommodated inside the hinge chamber 41. In the embodiment, the main body 121 of the glasses temple may have the shape of a long straight rod along the length direction. Correspondingly, the rod-shaped member 40 may be a straight rod along the length direction, and the hinge chamber 41 may be disposed inside the straight rod. Further, the hinge mount 31 may match the hinge chamber 41 to be accommodated inside the hinge chamber 41 to implement the installation of the hinge 30. Of course, in other embodiments, the rod-shaped member 40 may also have other shapes such as an arc-shaped rod.

In addition, the first insertion hole 42 may be formed during the molding process of the rod-shaped member 40, or may be further formed on a side wall of the rod-shaped member by a manner such as drilling after the molding process. Specifically, in the embodiment, the shape of the first insertion hole 42 may be a circle, and may be other shapes such as a square or a triangle in other embodiments. The shape of the fixing member 50 may match the first insertion hole 42 so that the fixing member 50 may be inserted into the first insertion hole 42 from the outside of the rod 40. Further, the hinge mount 31 may be fixed inside the hinge chamber 41 by abutting the side wall of the hinge mount 31 or further penetrating the outer wall of the hinge mount 31 in a plugging manner. Specifically, a matching thread may be provided on the inner wall of the first insertion hole 42 and the outer wall of the fixing member 50, Therefore, the fixing member 50 may be connected to the first insertion hole 42 in a screwing manner to further fix the hinge mount 31 inside the hinge chamber 41. Of course, other manners may also be used, such as connecting the first insertion hole 42 and the fixing member 50 in an interference fit manner.

Further, the hinge arm 32 may also be connected to other components. Therefore, after the other components are connected to the hinge arm 32, the other components and the rod-shaped member 40 or other components connected to the rod-shaped member 40 may further rotate around the rotating shaft 33 by mounting the hinge mount 31 inside the hinge chamber 41. For example, when the hinge component 122 is used in the glasses, the function member 20 (e.g., the speaker 21) may be connected to the end of the hinge arm 32 away from the hinge mount 31. Therefore, the function member 20 may be connected to the end of the main body 121 of the glasses temple away from the glasses rim 11 via the hinge 30.

In the above manner, the rod-shaped member 40 may be provided with the hinge chamber 41 communicating with the end surface of the rod-shaped member 40. The hinge 30 may be accommodated inside the hinge chamber 41 via the hinge mount 31. The fixing member 50 may further penetrate the side wall of the rod 40 via the first insertion hole 42. Therefore, the hinge mount 31 accommodated inside the hinge chamber 41 may be fixed inside the hinge chamber 41. Therefore, the hinge 30 may be detached relative to the rod-shaped member 40 to facilitate the replacement of the hinge 30 or the rod-shaped member 40. When applied to the glasses in the embodiment of the present disclosure described above, the hinge 30 and the function member 20 may be detachable relative to the main body 121 of the glasses temple. Therefore, it may be easy to replace when the function member 20, the glasses rim 11, or the main body 121 of the glasses temple is damaged.

Further referring to FIG. 3, in one embodiment, the hinge mount 31 may be provided with a second insertion hole 311 corresponding to the first insertion hole 42. The fixing member 50 may be further inserted into the second insertion hole 311.

Specifically, the shape of the second insertion hole 311 may match the fixing member 50, so that the fixing member 50 may be further inserted into the second insertion hole 311 to fix the hinge mount 31 after passing through the first insertion hole 42. Therefore, the shaking of the hinge mount 31 inside the hinge chamber 41 may be reduced and the hinge 30 may be fixed more firmly. Specifically, similar to the connection manner of the first insertion hole 42 and the fixing member 50, the inner wall of the second insertion hole 311 may be provided with a matching thread corresponding to the outer wall of the fixing member 50. Therefore, the fixing member 50 and the hinge mount 31 may be screwed together. Alternatively, the inner wall of the second insertion hole 311 and the outer wall of a corresponding contact position of the fixing member 50 may be smooth surfaces. Therefore, the fixing member 50 and the second insertion hole 311 may be in an interference fit, and be not specifically limited herein.

Further, the second insertion hole 311 may penetrate both sides of the hinge mount 31, so that the fixing member 50 may further penetrate the entire hinge mount 31. The hinge mount 31 may be more firmly fixed inside the hinge chamber 41.

Figure 4:
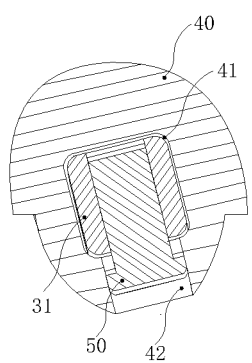
FIG. 4 illustrates a sectional view of the hinge component in FIG. 2 along an A-A axis according to some embodiments of the present disclosure.

Further referring to FIG. 4, FIG. 4 is a sectional view of the hinge component 122 in FIG. 2 along an A-A axis according to some embodiments of the present disclosure. In the embodiment, a cross-sectional shape of the hinge mount 31 may match a cross-sectional shape of the hinge chamber 41 in a section perpendicular to the longitudinal direction of the rod-shaped member 40. Therefore, the hinge mount 31 and the rod-shaped member 40 may form a tight fit after the insertion.

In some embodiments, the cross-sectional shape of the hinge mount 31 and the cross-sectional shape of the hinge chamber 41 may include any shape in the section shown in FIG. 4, as long as the hinge mount 31 is inserted into the hinge chamber 41 from an end surface of the rod-shaped member 40 away from the hinge arm 32. Further, the first insertion hole 42 may be disposed on a side wall of the hinge chamber 41, and pass through the side wall of the hinge chamber 41 and communicate with the hinge chamber 41.

In an application scenario, the cross-sectional shape of the hinge mount 31 and the cross-sectional shape of the hinge chamber 41 may have a rectangular shape. The first insertion hole 42 may be perpendicular to one side of the rectangle.

Specifically, in the application scenario, a corner angle of the outer wall of the hinge mount 31 or an angle of the inner wall of the hinge chamber 41 may be further in a fillet set to make contact between the hinge mount 31 and the hinge chamber 41 smoother. Therefore, the hinge mount 31 may be smoothly inserted into the hinge chamber 41.

It should be further pointed out that an amount of gas may be stored in the hinge chamber 41 before the hinge 30 is assembled. Therefore, if the hinge chamber 41 is a chamber with an open at only one end, the assembly of the hinge mount 31 may not be facilitated due to the difficulty in exhausting the gas inside the hinge chamber 41 during the assembly process. In the embodiment, the first insertion hole 42 may penetrate the side wall of the hinge chamber 41 and communicate with the hinge chamber 41 which may assist in exhausting the inner gas from the first insertion hole 42 through the hinge chamber 41 during the assembly, thereby facilitating the normal assembly of the hinge 30.

Figure 5:
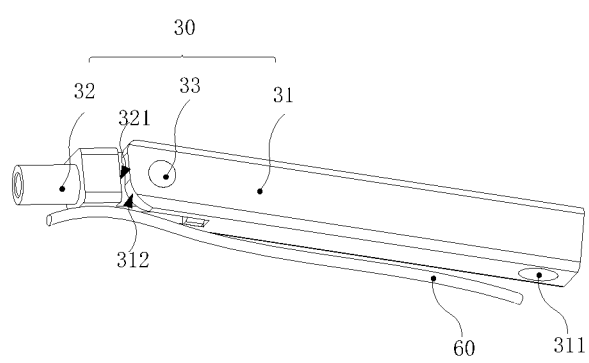
FIG. 5 is a schematic structural diagram illustrating a hinge component according to some embodiments of the present disclosure.
Figure 6:
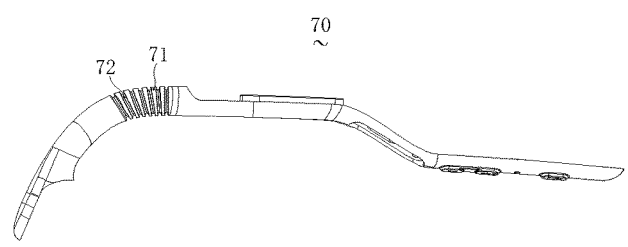
FIG. 6 is a diagram illustrating an original state of a protective sleeve according to some embodiments of the present disclosure.

Further referring to FIG. 5, FIG. 5 is a schematic structural diagram illustrating a hinge component according to an embodiment of the present disclosure. In the embodiment of the present disclosure, the hinge component 122 may further include a connection wire 60 disposed outside the hinge 30.

In some embodiments, the connection wire 60 may be a connection wire 60 having an electrical connection function and/or a mechanical connection function. When applied to the glasses in the embodiment of the present disclosure described above, the hinge component 122 may be used to connect the function member 20 to the end of the main body 121 of the glasses temple away from the glasses rim 11. A control circuit and the like related to the function member 20 may be disposed on the main body 121 of the glasses temple. At this time, the connection wire 60 may be required to electrically connect the function member 20 to the control circuit and the like of the main body 121 of the glasses temple. Specifically, the connection wire 60 may be located at one side of the hinge mount 31 and the hinge arm 32, and disposed in the same accommodation space with the hinge 30.

Further, the hinge mount 31 may include a first end surface 312. The hinge arm 32 may have a second end surface 321 disposed opposite the first end surface 312. It is easily understood that there is a gap between the first end surface 312 and the second end surface 321. Therefore, the hinge mount 31 and the hinge arm 32 may be relatively rotated around the rotating shaft 33. In the embodiment, during the relative rotation of the hinge arm 32 and the hinge mount 31, relative positions between the first end surface 312 and the second end surface 321 may also change. Therefore, the gap between thereof may become larger or smaller.

In the embodiment, the gap between the first end surface 312 and the second end surface 321 may always be kept larger than or less than the diameter of the connection wire 60. Therefore, the connection wire 60 located outside the hinge 30 may not be inserted into the gap between the first end surface 312 and the second end surface 321 during the relative rotation of the hinge mount 31 and the hinge arm 32, thereby reducing the damage to the connection wire 60 by the hinge. Specifically, during the relative rotation of the hinge arm 32 and the hinge mount 31, the ratio of the gap between the first end surface 312 and the second end surface 321 to the diameter of the connection wire 60 may always be kept greater than 1.5 or less than 0.8, for example, greater than 1.5, 1.7, 1.9, 2.0, etc., or less than 0.8, 0.6, 0.4, 0.2, etc., and be not specifically limited herein.

Figure 7:
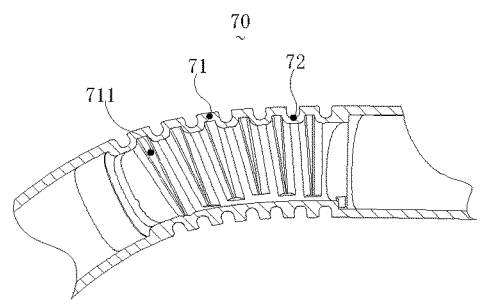
FIG. 7 is a partial sectional view illustrating an original state of a protective sleeve of a hinge component according to some embodiments of the present disclosure.
Figure 8:
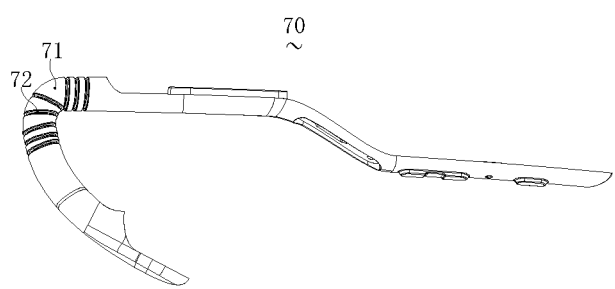
FIG. 8 is a diagram illustrating a bent state of a protective sleeve of a hinge component according to some embodiments of the present disclosure.
Figure 9:
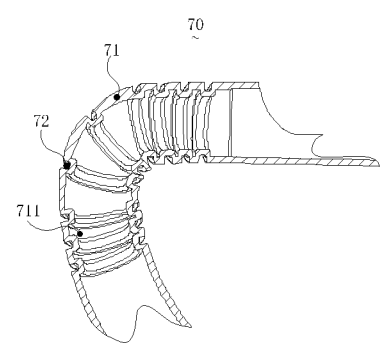
FIG. 9 is a partial sectional view illustrating a bent state of a hinge component protection sleeve according to some embodiments of the present disclosure.

Further referring to FIG. 2, and FIG. 6 to FIG. 9, FIG. 6 is a diagram illustrating an original state of a protective sleeve of a hinge component according to one embodiment of the present disclosure. FIG. 7 is a partial sectional view illustrating an original state of a protective sleeve of a hinge component according to an embodiment of the present disclosure. FIG. 8 is a diagram illustrating a bent state of a protective sleeve of a hinge component according to an embodiment of the present disclosure. FIG. 9 is a partial sectional view illustrating a bent state of a hinge component protection sleeve according to one embodiment of the present disclosure. In the embodiment, the hinge component 122 may also include a protective sleeve 70.

Specifically, the protective sleeve 70 may be disposed on the periphery of the hinge 30 and bent along with the hinge 30. In some embodiments, the protective sleeve 70 may include a plurality of annular ridge portions 71 spaced apart along the length direction of the protective sleeve 70 and annular connection portions 72 disposed between the annular ridge portions 71 and used to connect each two adjacent annular ridge portions. In some embodiments, the tube wall thickness of the annular ridge portion 71 may be greater than the tube wall thickness of the annular connection portion 72.

In some embodiments, the length direction of the protection sleeve 70 may be consistent with the length direction of the hinge 30. The protection sleeve 70 may be disposed along the length direction of the hinge mount 31 and the hinge arm 32. The protective sleeve 70 may be made of a soft material, such as soft silicone, rubber, etc.

The outer sidewall of the protective sleeve 70 may protrude outwardly to form the annular ridge portion 71. The shape of the inner sidewall of the protective sleeve 70 corresponding to the annular ridge portion 71 may not be specifically limited herein. For example, the inner wall may be smooth, or a recession may be disposed on the position of the inner wall corresponding to the annular ridge portion 71.

The annular connection portion 72 may be used to connect the adjacent annular ridge portions 71, specifically connected to an edge region of the annular ridge portion 71 near the inside of the protective sleeve 70. Therefore, the annular connection portion 72 may recess relative to the annular ridge portion 71 at a side of the outer wall of the protective sleeve 70.

Specifically, the count of the annular ridge portions 71 and the count of the annular connection portions 72 may be determined according to actual use conditions, for example, according to the length of the protective sleeve 70, the width of the annular ridge 71 and the width of the annular connection portion 72 in the longitudinal direction of the protective sleeve 70, or the like.

Further, the tube wall thickness of the annular ridge portion 71 and the tube wall thickness of the annular connection portion 72 refer to the thickness between the inner wall and the outer wall of the protective sleeve 70 corresponding to the annular ridge portion 71 and the annular connection portion 72, respectively. In the embodiment, the tube wall thickness of the annular ridge portion 71 may be greater than the tube wall thickness of the annular connection portion 72.

It should be easily understood when the hinge mount 31 and the hinge arm 32 of the hinge 30 are relatively rotated around the rotating shaft 33, the angle between the hinge mount 31 and the hinge arm 32 may change so that the protective sleeve 70 is bent as shown in FIGS. 8 and 9. Specifically, when the protective sleeve 70 is bent with the hinge 30, the annular ridge portion 71 and the annular connection portion 72 located in an outer region of the bent shape formed by the protective sleeve 70 may be in a stretched state, while the annular ridge portion 71 and the annular connection portion 72 located in an inner region of the bent shape may be in a compressed state.

In the embodiment, the tube wall thickness of the annular ridge portion 71 may be greater than the tube wall thickness of the annular connection portion 72. Therefore, the annular ridge portion 71 may be more rigid than the annular connection portion 72. Therefore, when the protective sleeve 70 is in the bent state, the protective sleeve 70 at the outer side of the bent shape may be in the stretched state. The annular ridge portion 71 may provide a strength support for the protective sleeve 70. At the same time, a region of the protective sleeve 70 at the inner side in the bent state may be compressed. The annular ridge portion 71 may also withstand a compression force, thereby protecting the protective sleeve 70, improving the stability of the protective sleeve 70, and extending the life of the protective sleeve 70.

Further, it should be noted that the shape of the protective sleeve 70 may be consistent with the state of the hinge 30. In one application scenario, both sides of the protective sleeve 70 along the length direction and rotating around the rotating shaft may be stretched or compressed. In another application scenario, the hinge mount 31 and the hinge arm 32 of the hinge 30 may rotate around the rotating shaft 33 only within a range less than or equal to 180 degree. That is, the protective sleeve 70 may only be bent toward one side. One side of the two sides of the protective sleeve 70 in the length direction may be compressed, and the other side may be stretched. At this time, according to different forces on the two sides of the protective sleeve 70, the two sides of the protective sleeve 70 under the different forces may have different structures.

In one embodiment, when the protective sleeve 70 is in the bent state, the width of the annular ridge portion 71 along the longitudinal direction of the protective sleeve 70 toward the outer side of the bent shape formed by the protective sleeve 70 may be greater than the width along the length of the protective sleeve 70 towards the inside of the bent shape.

In some embodiments, an increment of the width of the annular ridge portion 71 along the length direction of the protective sleeve 70 may further increase the strength of the protective sleeve. Meanwhile, in the embodiment, an original included angle between the hinge mount 31 and the hinge arm 32 may be less than 180 degree. At this time, if the annular ridge portions 71 of the protective sleeve 70 are uniformly disposed, the protective sleeve 70 may be compressed in the original state. In the embodiment, the width of the annular ridge portion 71 corresponding to one side of the outer region of the bent shape in the bent state may be relatively large, so that the length of the side of the protective sleeve 70 may increase. Therefore, during the increment of the strength of the protective sleeve 70, a stretching degree of the stretching side may be reduced when the protective sleeve 70 is bent. At the same time, the width of the annular ridge portion 71 along the longitudinal direction of the protective sleeve 70 toward the side of the inner region of the bent shape may be relatively small when the protective sleeve 70 is in the bent state, which may increase a space of the compressed annular connection portion 72 in the length direction of the protective sleeve 70, and alleviate the compression of the compressed side.

Further, in an application scenario, the width of the annular ridge portion 71 may gradually decrease from the side of the outer region towards the bent shape to the side of the inner region towards the bent shape. Therefore, the width toward the side of the outer region of the bent shape formed by the protective sleeve 70 may be greater than the width toward the side of the inner region of the bent shape when the protective sleeve 70 is in the bent state.

It should be easily understood that the annular ridge portions 71 are disposed around the periphery of the protective sleeve 70. In the length direction of the protective sleeve 70, one side may correspond to the stretched side, and the other side may correspond to the compressed side. In the embodiment, the width of the annular ridge portion 71 may gradually decrease from the side of the outer region towards the bent shape to the side of the inner region towards the bent shape, so that the width may be more uniform, which may improve the stability of the protective sleeve 70.

In one embodiment, the annular ridge portion 71 may be disposed with a groove 711 on an inner ring surface inside the protective sleeve 70 at the side of the outer region of the bent shape formed by the protective sleeve 70 when the protective sleeve 70 is in the bent state.

Specifically, the groove 711 in the embodiment may be disposed along a direction perpendicular to the length direction of the protective sleeve 70. Therefore, the corresponding annular ridge portion 71 may be appropriately extended in the length direction when the protective sleeve 70 is stretched.

As described above, when the protective sleeve 70 is in the bent state, the protective sleeve 70 towards the outer side of the bent shape formed by the protective sleeve 70 may be in the stretched state. In the embodiment, the groove 711 may be further disposed on the inner ring surface inside the protective sleeve 70 corresponding to the corresponding annular ridge portion 71, Therefore, the annular ridge portion 71 corresponding to the groove 711 may be appropriately extended to bear a portion of the stretch when the protective sleeve is stretched at the side, thereby reducing a tensile force experienced by the protective sleeve at the side, and protecting the protective sleeve 70.

It should be noted that the inner wall of the protective sleeve 70 corresponding to the annular ridge portion 71 at the side towards the inner region of the bent shape may not be disposed with the groove 711 when the protective sleeve 70 is in the bent state. In an embodiment, the width of the groove 71 along the length of the protective sleeve 70 may gradually decrease from the side of the outer region towards the bent shape to the side of the inner region towards the bent shape. Therefore, no groove 711 may be disposed on the inner side wall of the protective sleeve 70 corresponding to the annular ridge portion 71 towards the inner region side of the bent shape.

Specifically, when the hinge component 122 in the embodiment is applied to the glasses in the embodiment of the present disclosure described above, the protective sleeve 70 may be disposed on the main bodies 121 of the glass temples at both sides in the length direction of the protective sleeve 70, respectively, and connected to the function member 20. In an application scenario, the protective sleeve 70 may also be integrally formed as other structures of the glasses, such as protective covers of some components, so that the glasses may be more sealed and integrated.

It should be noted that the hinge component 122 in the embodiment of the present disclosure may not only be used in the glasses in the embodiment of the present disclosure, but also be used in other devices. Moreover, the hinge component 122 may also include other components related to the hinge 30 other than the rod-shaped member 40, the fixing member 50, the connection wire 60, the protective sleeve 70, etc. to achieve corresponding functions.

Figure 10:
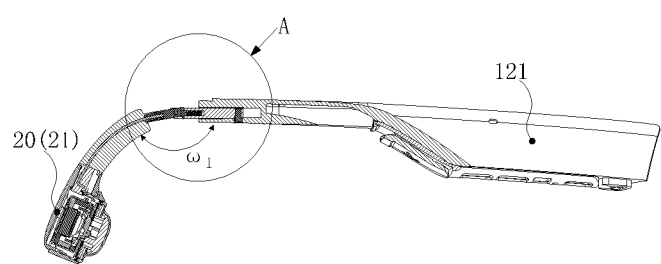
FIG. 10 is a partial sectional view illustrating glasses according to some embodiments of the present disclosure.
Figure 11:
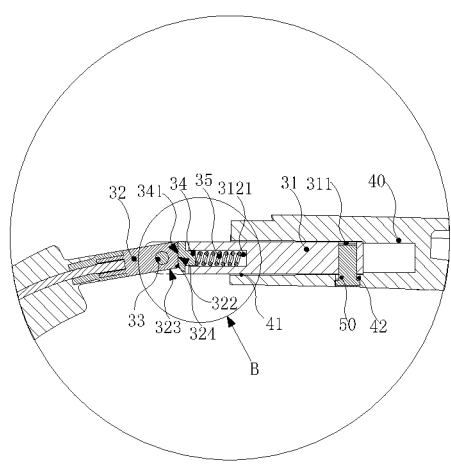
FIG. 11 is an enlarged view illustrating part A in FIG. 10 according to some embodiments of the present disclosure.
Figure 12:
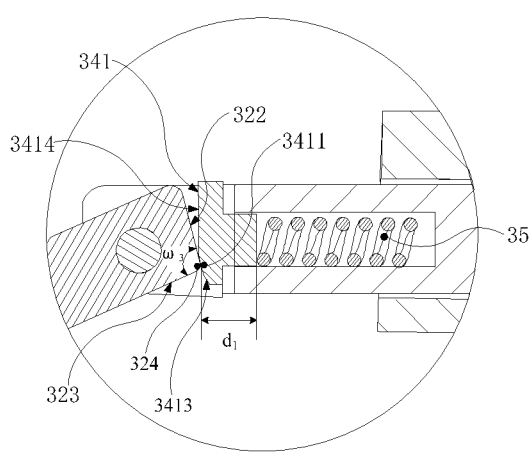
FIG. 12 is an enlarged view illustrating part B in FIG. 11 according to some embodiments of the present disclosure.
Figure 13:
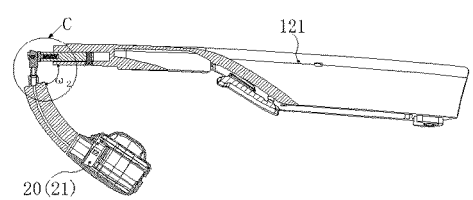
FIG. 13 is a partial sectional view illustrating glasses according to some embodiments of the present disclosure.
Figure 14:
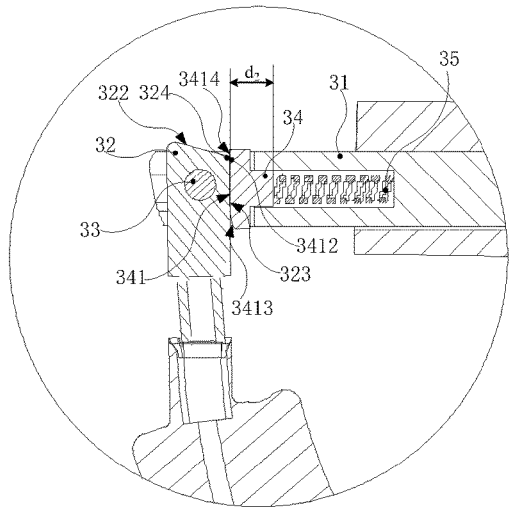
FIG. 14 is an enlarged view illustrating part C in FIG. 13 according to some embodiments of the present disclosure.

Specifically, referring to FIG. 10 to FIG. 14 together, FIG. 10 is a partial sectional view illustrating a hinge according to an embodiment of the present disclosure. FIG. 11 an enlarged view illustrating part A in FIG. 10 according to some embodiments of the present disclosure. FIG. 12 is an enlarged view illustrating part B in FIG. 11 according to some embodiments of the present disclosure. Specifically, FIG. 12 shows an enlarged view illustrating part B in FIG. 11 when the abutting between a first support surface and a third support surface is changed to the abutting between a second support surface and the third support surface, Therefore, a connection between the first support surface and the second support surface initially touches the third support surface. FIG. 13 is a partial sectional view illustrating a hinge according to an embodiment of the present disclosure. FIG. 14 is an enlarged view illustrating part C in FIG. 13 according to some embodiments of the present disclosure. It should be noted that the hinge 30 in the embodiment of the present disclosure may be used in the glasses in the embodiment of the present disclosure. The hinge 30 may be used in the hinge component 122 in the embodiments of the present disclosure, or used in other devices, and be not specifically limited herein.

In the embodiment, the hinge arm 32 of the hinge 30 may have a first support surface 322 and a second support surface 323 connected to each other.

The hinge 30 may also include a support member 34 and an elastic member 35. The support member 34 may be flexibly disposed on the hinge mount 31 and have a third support surface 341. The elastic member 35 may be used to elastically offset the support member 34 toward the hinge arm 32, so that the third support surface 341 may elastically abut on the first support surface 322 and the second support surface 323, respectively.

In some embodiments, when the hinge arm 32 is rotated relative to the hinge mount 31 under an external force, a connection 324 of the first support surface 322 and the second support surface 323 may drive the support member 34 against the elastic offset of the elastic member 35 to move in the opposite direction. Therefore, the third support surface 341 may be switched from elastically abutting on one of the first support surface 322 and the second support surface 323 to elastically abutting on the other of the first support surface 322 and the second support surface 323.

In an application scenario, the support member 34 may be connected to an end of the elastic member 35 towards the hinge arm 32. The third support surface 341 may face the side toward the hinge arm 32. In the process that the hinge arm 32 is rotated relative to the hinge mount 31 around the rotating shaft 33 under the external force, the third support surface 341 may be pushed so that the support member 34 may compress the elastic member 35. Further, the elastic offset may occur under the action of the elastic member 35. Of course, the elastic member 35 may be disconnected to the support member 34, and only abut on one side of the support member 34 as long as the support member 34 implements the elastic offset.

In some embodiments, the first support surface 322 and the second support surface 323 may be two side surfaces adjacent to the hinge arm 32 and at least partially parallel to the central axis of the rotating shaft 33, or a portion of the two side surfaces. When the hinge arm 32 rotates relative to the hinge mount 31, the first support surface 322 and the second support surface 323 may rotate with the hinge arm 32 around the rotating shaft 33. Therefore, different side surfaces of the hinge arm 32 may face the hinge mount 31. Thus, the hinge arm 32 may have different positions relative to the hinge mount 31.

In addition, the elastic member 35 may be a member that may provide an elastic force and be compressed in an elastic direction to provide a compression space. For example, the elastic member 35 may include a spring. One end of the spring may abut on the support member 34, When the third support surface 341 of support member 34 is pushed toward the elastic member 35, the elastic member 35 may be against the support member 34 and be compressed to provide a space in a direction that the third support surface 341 of the support member 34 faces. Therefore, when a relative position of the rotating shaft 33 is unchanged, there may be still enough space for different sides of the hinge arm 32 to rotate between the rotating shaft 33 and the third support surface 341.

Specifically, when the hinge arm 32 rotates relative to the hinge mount 31, the relative position of the rotating shaft 33 may be unchanged, A contact position of the hinge arm 32 and the third support surface 341 of the hinge mount 31 may change. Since distances between different positions of the hinge arm 32 and the rotating shaft 33 are different, the required space between the rotating shaft 33 and the contact position of the hinge arm 32 and the third support surface 341 may be different when different positions of the hinge arm 32 (e.g., different positions of the first support surface 322 and the second support surface 323) contact the third support surface 341. Due to the limitation of the elastic force and the space, the space provided by the compression of the elastic member 35 may be limited. Therefore, during the rotation of the hinge arm 32 relative to the hinge mount 31, if a distance between a position of the hinge arm 32 and the rotating shaft 33 is too large in a section perpendicular to the central axis of the rotating shaft 33, the position may be locked at another position of the third support surface during the rotation process, so that the hinge arm 32 may not continue to rotate. Therefore, the hinge arm 32 and the hinge mount 31 only rotates relatively within a range. In an application scenario, during the relative rotation between the hinge arm 32 and the hinge mount 31 around the rotating shaft 33, only the first support surface 322, the second support surface 323, and a region corresponding to the connection 324 between the first support surface 322 and the second support surface 323 may abut on the third support surface 341.

Further, in the embodiment, the first support surface 322 and the second support surface 323 may both be planes. A distance from the rotating shaft 33 to the connection 324 of the two support surfaces may be greater than a distance from the rotating shaft 33 to the first support surface 322 and a distance to the second support surface 323. The hinge 30 may have two relatively stable states that the third support surface 341 abuts on the first support surface 322 and the third support surface 341 abuts on the second support surface 323.

Of course, in the embodiment, the first support surface 322 and the second support surface 323 may also be curved surfaces with a radian or even include different sub-support surfaces, as long as a positional relationship between the hinge arm 32 and the hinge mount 31 may have at least two corresponding relatively stable states, and be not specifically limited herein. In addition, the hinge arm 32 may be disposed with more support surfaces. The hinge arm 32 and the hinge mount 31 may have various relative positional relationships by the different support surfaces elastically abutting on the third support surface 341 when the hinge arm 32 rotates relative to the hinge mount 31 around the rotating shaft 33 under an external force, and be not specifically limited herein.

Specifically, as shown in FIG. 11 and FIG. 12, an original state that the first support surface 322 abuts on the third support surface 341 of the support member 34 may be taken as an example. At this time, the elastic member 35 may have an elastic compression deformation, or be in an original natural state, and be not limited herein. When the hinge arm 32 rotates relative to the hinge mount 31 around the rotating shaft 33 under an external force of the hinge 30. Therefore, the second support surface 323 gradually approaches the third support surface 341, the connection 324 between the first support surface 322 and the second support surface 323 may touch the third support surface 341. Since the distance from the connection 324 to the rotating shaft 33 may be greater than the distance from the first support surface 322 to the rotating shaft 33, the connection 324 may abut on the support member 34 and push the support member 34 move toward the elastic member 35, thereby allowing the elastic member 35 against the pull to compress. When the hinge arm 32 is further stressed, the connection 324 may gradually approach a region between the rotating shaft 33 and the third support surface 341. In the process, the distance between the rotating shaft 33 and the third support surface 341 may gradually increase. It should be easily understood when a connection line between the connection 324 and the rotating shaft 33 is perpendicular to the third support surface 341, the distance from the rotating shaft 33 to the third support surface 341 may be equal to the distance from the rotating shaft 33 to the connection 324 in a section perpendicular to the central axis of the rotating shaft 33. At this time, the rotating shaft 33 may be farthest from the third support surface 341. At this time, if the force is continuously applied to the hinge 30, the distance from the rotating shaft 33 to the third support surface 341 may gradually become smaller, so that the required compression space of the elastic member 35 may be reduced. Then the elastic member 35 may gradually release the elastic force and recover until the connection 324 leaves the third support surface 341 and the second support surface 323 abuts on the third support surface 341, thereby switching from abutting the first support surface 322 on the third support surface 341 to abutting the second support surface 323 on the third support surface 341.

Similarly, the process (as shown in FIG. 13 and FIG. 14) for switching from an original state that the second support surface 323 abuts on the third support surface 341 of the support member 34 to a state that the first support surface 322 abuts on the third support surface 341 of the support member 34 may be similar to the above process.

It should be noted that the hinge 30 in the embodiment may be applied to the hinge component 122 of the glasses in the embodiment of the present disclosure. When the third support surface 341 is switched from elastically abutting on one of the first support surface 322 and the second support surface 323 to elastically abutting on the other of the first support surface 322 and the second support surface 323, the hinge component 122 may drive the speaker 21 to switch between a first relatively fixing position and a second relatively fixing position relative to the main body 121 of the glasses temple. The hinge component 122 may fit on the back of an auricle of the user when the speaker 21 is in the first relatively fixing position. As used herein, the auricle may be a portion of an external ear and mainly composed of cartilage. In some embodiments, the speaker 21 may include a bone conduction speaker. By fitting the speaker to the back of the auricle, the cartilage of the auricle may be used to transmit bone conduction sound/vibration. The bone conduction speaker may be fitted to the back of the auricle, thereby improving the sound quality and reducing the impact on an ear canal during the sound transmission.

It should be noted that the distance from the rotating shaft 33 to the connection 324 may be greater than a vertical distance from the first support surface 322 and the second support surface 323. Therefore, in the process that the third support surface 341 is switched from elastically abutting on one of the first support surface 322 and the second support surface 323 to elastically abutting on the other of the first support surface 322 and the second support surface 323, the state of the hinge 30 may change abruptly.

The switch from elastically abutting between the first support surface 322 and the third support surface 341 to elastically abutting between the second support surface 323 and the third support surface 341 may be taken as an example. When a ratio between the maximum distance $h_1$ from the rotating shaft 33 to the connection 324 and the shortest distance $h_2$ from the rotating shaft 33 to the first support surface 322 is different, the change during the switching process may be different.

In one embodiment, the ratio between the maximum distance h1 from the rotating shaft 33 to the connection 324 and the shortest distance $h_2$ from the rotating shaft 33 to the first support surface 322 may be between 1.1 and 1.5 in the section perpendicular to the central axis of the rotating shaft 33.

Specifically, the maximum distance $h_1$ from the rotating shaft 33 to the connection 324 may be larger than the shortest distance $h_2$ of the rotating shaft 33 to the first support surface 322 by disposing the rotating shaft 33 away from the second support surface 323 and close to the side of the hinge arm 32 opposite to the second support surface 323, thereby satisfying the ratio described above.

It should be noted that the change may become obvious when the ratio between $h_1$ and $h_2$ is too large. However, a large force may be needed to switch from elastically abutting between the first support surface 322 and the third support surface 341 to elastically abutting between the second support surface 323 and the third support surface 341, thereby causing inconvenience. If the ratio between $h_1$ and $h_2$ is too small, although it is easier to switch the state, the change may be small. For example, when the user pulls the hinge 30, there may be no obvious handle sense, causing inconvenience. In the embodiment, the ratio of $h_1$ to $h_2$ may be set between 1.1 and 1.5, and the hinge 30 may have a more obvious change when the third support surface 341 is switched from elastically abutting on the first support surface 322 to elastically abutting on the second support surface 323. Thus, during use, the user may have a relatively obvious handle sense of pulling the hinge 30. At the same time, the change may not be too abrupt to making it difficult for the user to switch the state of the hinge 30.

In an application scenario, the ratio of $h_1$ to $h_2$ may also be between 1.2 and 1.4. Specifically, the ratio of $h_1$ to $h_2$ may also be 1.1, 1.2, 1.3, 1.4, 1.5, etc., and be not specifically limited herein.

In addition, the positions of the first support surface 322 and the second support surface 323 set on the hinge arm 32 may affect the included angle between the hinge arm 32 and the hinge mount 31 when the third support surface 341 abuts on one of the first support surface 322 and the second support surface 323. Therefore, the positions of the first support surface 322 and the second support surface 323 on the hinge arm 32 may be set differently according to specific user requirements. In some embodiments, the included angle between the hinge arm 32 and the hinge mount 31 may be specifically shown in FIG. 9 and FIG. 12. ω1 may be the included angle between the hinge arm 32 and the hinge mount 31 when the third support surface 341 abuts on the first support surface 322. ω2 may be the included angle between the hinge arm 32 and the hinge mount 31 when the third support surface 341 abuts on the second support surface 323. In one embodiment, each of the hinge arm 32 and the hinge mount 31 may have a length. The hinge arm 32 may be disposed on one end side of the hinge mount 31 in the length direction. The first support surface 322 may be disposed at the end of the hinge arm 32 near the hinge mount 31 in the length direction. The second support surface 323 may be disposed at one end in the width direction of the hinge arm 32 and parallel to the central axis of the rotating shaft 33. At this time, when the third support surface 341 elastically abuts on the first support surface 322, the included angle between the hinge arm 32 and the hinge mount 31 may be the largest. When the third support surface 341 elastically abuts on the second support surface 323, the included angle between the hinge arm 32 and the hinge mount 31 may be the smallest. Therefore, the included angle between the hinge mount 31 and the hinge arm 32 may be changed from ω1 to ω2 and become smaller when the third support surface 341 is switched from elastically abutting on the first support surface 322 to elastically abutting on the second support surface 323.

It should to be further noted that if the direction of the force applied to the hinge arm 32 is the same as the direction of the gravity of the hinge arm 32 when the third support surface 341 is switched from elastically abutting on the first support surface 322 to elastically abutting on the second support surface 323, the switching in this state may make the included angle between the hinge mount 31 and the hinge arm 32 smaller. The setting of the ratio between the $h_1$ and $h_2$ in the embodiment may also make the hinge arm 32 not or hardly reduce the angle between the hinge arm 32 and the hinge mount 31 spontaneously due to the own gravity when the third support surface 341 elastically abut on the first support surface 322.

In an embodiment of a hinge in the present disclosure, referring to FIG. 12, the included angle $\omega_3$ between the first support surface 322 and the second support surface 323 may be an obtuse angle in a section perpendicular to the central axis of the rotating shaft 33.

In some embodiments, when the hinge 30 switches from the state of elastically abutting between the first support surface 322 and the third support surface 341 to the state of elastically abutting between the second support surface 323 and the third support surface 341, the smaller the included angle $\omega_3$ between the first support surface 322 and the second support surface 323, the larger the relative rotation angle between the hinge mount 31 and the hinge arm 32 may be when the state is switched. That is, when the hinge mount 31 is fixed, the user may need to move the hinge arm 32 to a larger angle to switch the state of the hinge 30, so that the user may be laborious and it may bring inconvenience to the user.

Since the hinge arm 32 has a length, and the first support surface 322 is disposed at one end in the length direction of the hinge arm 32, the second support surface 323 may be disposed adjacent to the first support surface 322 in the width direction of the hinge arm 32. Normally, the first support surface 322 and the second support surface 323 may be arranged vertically. At this time, when the hinge 30 is switched between the two states, the hinge arm 32 and the hinge mount 31 may need to be moved relative to each other by 90 degree.

In the embodiment, in the section perpendicular to the central axis of the rotating shaft 33, the included angle $\omega_3$ between the first support surface 322 and the second support surface 323 may be an obtuse angle. Thus, the angle required for the relative movement of the hinge arm 32 and the hinge mount 31 may be less than 90 degree when the hinge 30 switches between the two states, which may facilitate the user.

Specifically, when the hinge 30 in the embodiment is used in the embodiment of the glasses in the present disclosure, the hinge 30 may be used to connect the main body 121 of the glasses temple and the speaker 21, In some embodiments, the speaker 21 may be a bone conduction speaker. For example, when the hinge 30 is in a second state of elastically abutting between the second support surface 323 and the third support surface 341, the speaker 21 may be in the first relatively fixing position to fit the back of the auricle of the user. Therefore, when the user needs to use the function of the speaker 21 of the glasses, the user may only need to rotate the speaker 21 by an angle less than 90 degree to fit it to the back of the auricle of the user. In addition, when the hinge 30 is in a first state of elastically abutting between the first support surface 322 and the third support surface 341, the hinge arm 32 and the connected speaker 21 may form an angle. Therefore, the hinge arm 32 and the connected speaker 21 may be located behind an ear of the user and face the direction of the ear of the user when the user wears the glasses. Therefore, the glasses may be blocked and fixed, and prevented from falling off the head of the user.

It should be noted that the included angle $\omega_3$ between the first support surface 322 and the second support surface 323 may be set according to actual requirements. If the included angle is too large, the included angle between the hinge arm 32 and the hinge mount 31 and the angle between the function member 20 connected to the end of the hinge arm 32 away from the hinge mount 31 and the hinge mount 31 may be smaller. Therefore, the hinge arm 32 and the function member 20 may be too close to the ears of the user to compress the ears when the user wears it, reducing the comfort of the user. If the included angle is too small, on the one hand, the required angle may be too large, which is inconvenient for the user when the user moves the speaker 21 to switch between the first relative position and the second relative position. On the other hand, the included angle between the main body 121 of the glasses temple and the hinge 30 and the included angle between the main body 121 of the glasses temple and the speaker 21 may be too small to play a role in blocking and fixing the glasses. Therefore, the glasses may be easily dropped from the front side of the head of the user when the user wears the glasses. Specifically, the included angle between the first support surface 322 and the second support surface 323 may be set according to the shape of the head of the user.

Specifically, in an application scenario, in the section perpendicular to the central axis of the rotating shaft 33, the included angle $\omega_3$ between the first support surface 322 and the second support surface 323 may be between 100 degree and 120 degree, and specifically be 100 degree, 110 degree, 120 degree, or the like. The setting of the angle may enable the user to wear the glasses, and the speaker 21 may not be too close to the ears of the user to cause discomfort to the ears of the user when the speaker 21 is in the first relatively fixing position. It may be unnecessary to rotate the hinge by an excessive angle upon switching between the two relative positions of the speaker 21, which is convenient for users.

In some embodiments, in the process that the third support surface 341 is switched from elastically abutting on one of the first support surface 322 and the second support surface 323 to elastically abutting on the other of the first support surface 322 and the second support surface 323, the connection 324 between the first support surface 322 and the second support surface 323 may abut on the third support surface 341, and drive the support member 34 against the elastic offset of the elastic member 35 to move in the opposite direction. Elastically abutting between the third support surface 341 and the first support surface 322 before the switching may be taken as an example. At the start of the switching, while the first support surface 322 gradually moves away from the third support surface 341, the connection 324 may gradually abut on the third support surface 341 and slide from one side of the third support surface 341 to another side of the third support surface 341 during the switching process. Finally, the second support surface 323 and the third support surface 341 may further turn to elastically abut. During the state switching process, the connection 324 may always abut on and interact with the third support surface 341. The shape of the connection 324 may have an effect on the state switching process. For example, if the first support surface 322 and the second support surface 323 are line-connected, the connection 324 may have a relatively sharp angle. Therefore, during the user pulls the hinge mount 31 and/or the hinge arm 32 to switch the state of the hinge 30, on the one hand, the buffer may be small and the switching may be abrupt upon switching from abutting between the connection 324 and the third support surface 341 to abutting between the connection 324 and the first support surface 322 and the second support surface 323, Thus the handle sense of moving the hinge 30 may be poor. On the other hand, the connection 324 may be relatively sharp, which may cause wear to the third support surface 341 during repeated switching processes.

In one embodiment of the present disclosure, in a section perpendicular to the central axis of the rotating shaft 33, the connection 324 may have a shape of an arc. As a result, the connection between the first support surface 322 and the second support surface 323 may be a connection with an arc surface. During the state switching process of the hinge 30, the connection 324 abutting on the third support surface 341 may be relatively smooth, so that the user may have a better handle sense of pulling the hinge 30. The damage to the third support surface 341 may be reduced during repeated switching processes.

Specifically, in one embodiment, the connection 324 may have a shape of a circular arc. If a curvature of the arc is different, effects brought by the curvatures may be different. The curvature may be set in combination with actual use situations. The curvature of the arc in the embodiment may be between 5 and 30, and specifically 5, 10, 15, 20, 25, 30, etc., and be not limited herein.

It should be noted when the hinge 30 in the embodiment is applied to the glasses in the embodiment described above, the circular arc shape of the curvature of the connection 324 may enable the user to have a better feel when the hinge 30 is pulled to drive the speaker to switch between the first relatively fixing position and the second relatively fixing position.

In one embodiment, the third support surface 341 may be set so that the external force required when the third support surface 341 is switched from elastically abutting on the first support surface 322 to elastically abutting on the second support surface 323 may be different from the external force required when the third support surface 341 is switched from elastically abutting on the second support surface 323 to elastically abutting on the first support surface 322.

It should be noted that, in a specific use scenario, different states of the hinge 30 may correspond to different functions of the hinge 30 or structures connected to the hinge 30. Alternatively, due to a setting problem of the position of the hinge 30, it may not be convenient for the user to exert a force to switch from one state to another. When the user switches the state of the hinge 30, it may be necessary to distinguish the strength of pulling the hinge 30 to facilitate the user to exert the force, or to provide the user with an intuitive experience to distinguish the two hinge states.

Specifically, when the hinge 30 in the embodiment is applied to the glasses, the state switching of the hinge 30 may drive the speaker 21 to switch between the first relatively fixing position and the second relatively fixing position relative to the main body 121 of the glasses temple. Correspondingly, the two relatively fixing positions may correspond to two situations where the user uses the speaker 21 and where the user does not use the speaker 21. When the user wears the glasses, difficulty of applying forces to the back of the head to switch between the two states may be different. Therefore, the design of applying different external forces to correspondingly switching between different states may facilitate the usage of the user.

Specifically, in an embodiment, when the third support surface 341 is switched from elastically abutting on the first support surface 322 to elastically abutting on the second support surface 323, the speaker 21 may move from the second relatively fixing position to the first relatively fixing position so as to fit the back of the auricle of the user.

Further, in the embodiment, the third support surface 341 may be set such that the external force required when the third support surface 341 is switched from elastically abutting on the first support surface 322 to elastically abutting on the second support surface 323 may be less than the external force required when the third support surface 341 is switched from elastically abutting on the second support surface 323 to elastically abutting on the first support surface 322.

It should be noted that when the speaker 21 is used in the glasses, the third support surface 341 may need to be switched from elastically abutting on the first support surface 322 to elastically abutting on the second support surface 323 upon being applied to the glasses. When the speaker 21 is not used, the third support surface 341 may need to be switched from elastically abutting on the second support surface 323 to elastically abutting on the third support surface 341. According to the embodiment, the force required when the user uses the speaker 21 may be less than the force required when the speaker 21 is not used. Therefore, it may be convenient for the user to use the function of the speaker 21 of the glasses.

Specifically, referring to FIG. 12 and FIG. 14 together, in an application scenario, when the third support surface 341 is switched from elastically abutting on the first support surface 322 to elastically abutting on the second support surface 323, the connection 324 may initially contact a first position 3411 of the third support surface 341. When the third support surface 341 is switched from t elastically abutting on the second support surface 323 to elastically abutting on the first support surface 322, the connection 324 may initially contact a second position 3412 of the third support surface 341. In some embodiments, in a section perpendicular to the central axis of the rotating shaft 33, a distance d1 between the first position 3411 and a contact point of the elastic member 35 and the support member 34 along the direction of the elastic offset of the elastic member 35 may be less than a distance d2 between the second position 3412 and the contact point in the direction of the elastic offset.

It should be noted when the third support surface 341 elastically abuts on the first support surface 322, the connection 324 may be located near a position of one end of the third support surface 341. When the third support surface 341 elastically abuts on the second support surface 323, the connection 324 may be located near a position of another end of the third support surface 341. Therefore, the first position 3411 and the second position 3412 may be located near the two ends of the third support surface 341, respectively. That is, in the embodiment, a distance between the positions of the third support surface 341 of the support member 34 near the two ends may be different from a distance between the elastic member 35 and the contact point of the support member 34 in the direction of the elastic offset of the elastic member 35. The distance corresponding to the second position 3412 may be less than the distance corresponding to the first position 3411. At this time, when the third support surface 341 is switched from elastically abutting on the first support surface 322 to elastically abutting on the second support surface 323, the connection 324 may not immediately abut on the third support surface 341 and receive a reaction force of the elastic member 35, but gradually abut on the third support surface 341 and receive the reaction force of the elastic member 35 during the switching process. When the third support surface 341 is switched from elastically abutting on the first support surface 322 to elastically abutting on the second support surface 323, the connection 324 may initially abut on the third support surface 341 and receive the reaction force of elastic member 35, or at least receive the reaction force of elastic member 35 earlier than that the third support surface 341 is switched from elastically abutting on the second support surface 323 to elastically abutting on the first support surface 322. Therefore, in this case, the hinge 30 may need a smaller force to switch from elastically abutting on the first support surface 322 to elastically abutting on the second support surface 323. Therefore, the force required to move the speaker 21 may be small when the user uses the speaker 21, which is convenient for the user.

Further, the third support surface 341 may include a first sub-support surface 3413 and a second sub-support surface 3414. In some embodiments, the first position 3411 may be disposed on the first sub-support surface 3413. The second position 3412 may be disposed on the second sub-support surface 3414. That is, the first sub-support surface 3413 and the second sub-support surface 3414 may be disposed near the two ends of the third support surface 341, respectively.

In some embodiments, the second sub-support surface 3414 may be a plane. Specifically, when the first support surface 322 or the second support surface 323 elastically abuts on the third support surface 341, the second sub-support surface 3414 may be parallel to the first support surface 322 or the second support surface 323. The first sub-support surface 3413 may be a flat surface or a curved surface, and be not limited herein.

Further, the first sub-support surface 3413 and the second sub-support surface 3414 may not be located in the same plane. The first sub-support surface 3413 may be inclined relative to the second sub-support surface 3414. An included angle between the two sub-support surfaces may be no greater than 10 degree, for example, no greater than 2 degree, 4 degree, 6 degree, 8 degree, 10 degree, etc. Specifically, the first sub-support surface 3413 may be disposed in a direction away from the hinge arm 32. Therefore, in the section perpendicular to the central axis of the rotating shaft 33, the distance between the first position 3411 and the elastic member 35 and the distance between the first position 3411 and the contact point of the elastic member 35 in the direction of the elastic offset of the elastic member 35 may be less than the distance between the second position 3412 and the contact point in the direction of the elastic offset. In some embodiments, when the first sub-support surface 3413 is a curved surface and the second sub-support surface 3414 is a flat surface, the included angle between the first sub support surface 3413 and the second sub-support surface 3414 may be an included angle between a plane tangent to the first sub support surface 3413 and the second sub support surface 3414 at the intersection of the two sub-support surfaces.

Figure 15:
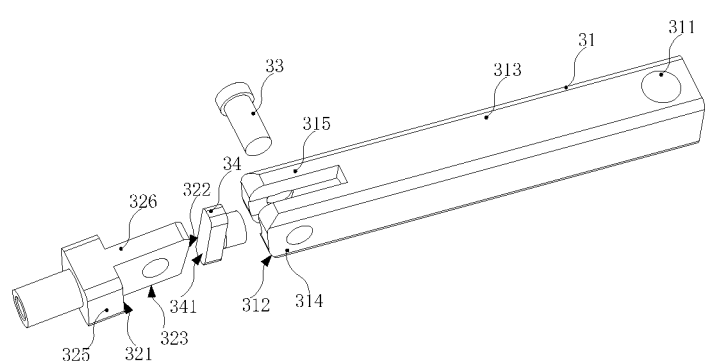
FIG. 15 is an exploded structural diagram illustrating glasses according to some embodiments of the present disclosure.

Referring to FIG. 15, FIG. 15 is an exploded structural diagram illustrating a hinge according to an embodiment of the present disclosure. In the embodiment, the hinge mount 31 may include a mount body 313, and a first lug 314 and a second lug 315 protruding from the mount body 313 and spaced from each other. The hinge arm 32 may include an arm body 325 and a third lug 326 protruding from the arm body 325. The third lug 326 may be inserted into an interval region between the first lug 314 and the second lug 315, and rotatably connected to the first lug 314 and the second lug 315 via the rotating shaft 33. The first support surface 322 and the second support surface 323 may be disposed on the third lug 326. The support member 34 may be at least partially disposed in the interval region and located at the side of the third lug 326 towards the mount body 313. The mount body 313 may be disposed with an accommodation chamber 3121 communicating with the interval region. The elastic member 35 may be disposed inside the accommodation chamber 3121, and allow the support member 34 elastically offset towards the third lug 326.

Specifically, corresponding positions of the first lug 314, the second lug 315, and the third lug 326 may be respectively disposed with a first through-hole, a second through-hole, and a third through-hole located in a same axial direction. Inner diameters of the three through-holes may be no less than the outer diameter of the rotating shaft 33. Thus, when the rotating shaft 33 passes through a corresponding through-hole, the hinge mount 31 where the first lug 314 and the second lug 315 are located may be rotatably connected to the hinge arm 32 where the third lug 326 is located.

In some embodiments, the first support surface 322 and the second support surface 323 may be both disposed on the third lug 326 and parallel to the central axis of the rotating shaft 33. Therefore, the first support surface 322 and the second support surface 323 may enter the interval region between the first lug 314 and the second lug 315 when the hinge arm 32 rotates around the rotating shaft 33 relative to the hinge mount 31.

Further, the support member 34 may be located between the first lug 314 and the second lug 315 of the mount body 313. The third support surface 341 of the support member 34 may be disposed toward the third lug 326. In one application scenario, the elastic member 35 may be completely set inside the accommodation chamber 3121, and touch the support member 34 at the side towards the interval region between the first lug 314 and the second lug 315. When the elastic member 35 is in a natural state, a region of the support member 34 near the elastic member 35 may be at least partially located inside the accommodation chamber 3121. It should be noted that the shape of the portion of the support member 34 inside the accommodation chamber 3121 may match the shape of the accommodation chamber 3121. Therefore, the portion of the support member 34 located inside the accommodation chamber 3121 may stably slide inside the accommodation chamber 3121 when the support member 34 is elastically offset via the elastic member 35.

In an application scenario, a sectional area of the accommodation chamber 3121 may be less than a sectional area of the interval region between the first lug 314 and the second lug 315 in a section perpendicular to the length direction of the hinge mount 31. The shape of the support member 34 region outside the accommodation chamber 3121 may match the interval region. Therefore, the support member 34 may not all enter the accommodation chamber 3121 upon moving toward a side of the elastic member 35.

Of course, in other embodiments, the sectional shape of the accommodation chamber 3121 may be the same as the interval region between the first lug 314 and the second lug 315 in the section perpendicular to the length direction of the hinge mount 31. At this time, the support member 34 may completely enter the accommodation chamber 3121. Therefore, the support member 34 may slide inside the entire accommodation chamber 3121 upon receiving a pushing force.

Further, when the hinge 30 in the embodiment is applied to the hinge component 122 in the embodiment of the hinge component in present disclosure, the first end surface 312 of the hinge mount 31 may be an end surface of the first lug 314 and the second lug 315 toward the hinge arm 32. The third lug 326 facing a protrusion toward the arm body 325 may be located inside the interval region between the first lug 314 and the second lug 315. Therefore, the first end surface 312 of the first lug 314 and the second lug 315 may be disposed toward the arm body 325. In a section of the central axis direction of the rotating shaft 33, the arm body 325 may be further protruded from the third lug 326 to form a second end surface 321 of the first lug 314 and the second lug 315 toward the hinge mount 31.

In the embodiment, during the relative rotation of the hinge arm 32 and the hinge mount 31, a gap between the first end surface 312 of the first lug 314 and the second lug 315 and the second end surface 321 of the arm body 325 may always be larger or smaller than the diameter of the connection wire 60. Therefore, the connection wire 60 may not be sandwiched between the first lug 314 and the second lug 315 and the arm body 325 during the relative rotation of the hinge mount 31 and the hinge arm 32, thereby reducing the damage of the connection wire 60 by the hinge 30.

In an application scenario, the gap between the second end surface 321 of the first lug 314 and the second lug 315 and the first end surface 312 of the arm body 325 may always be kept much larger or smaller than the diameter of the connection wire 60 during the relative rotation of the hinge arm 32 and the hinge mount 31, thereby further reducing the damage of the connection wire 60 by the hinge 30.

It should be noted that, in the embodiment, the gap between the first end surface 312 and the second end surface 321 may be a gap with even size, thereby satisfying the above condition of being greater than or less than the diameter of the connection wire 60. Alternatively, in another embodiment, only gaps of positions at both end surfaces close to the connection wire 60 may be greater than or less than the diameter of the connection wire 60. Gaps of other positions at both end surfaces may not need to satisfy the condition.

Specifically, in an application scenario, in a section perpendicular to the central axis of the rotating shaft 33, at least one of an end surface of the first lug 314 and the second lug 315 towards the hinge arm 32 and an end surface of the arm body 325 towards the hinge mount 31 may be in a chamfer setting. Therefore, during the relative rotation of the hinge arm 32 and the hinge mount 31, the positions close to the connection wire 60 may always be kept larger than the diameter of the connection wire 60.

In some embodiments, the chamfer setting may be filleted, or directly chamfered.

In the application scenario, it may be only necessary to chamfer at least one of the end surface of the first lug 314 and the second lug 315 near the connection wire 60 towards the hinge arm 32 and the end surface of the arm body 325 towards the hinge mount 31. Therefore, during the relative rotation of the hinge arm 32 and the hinge mount 31, the connection wire 60 may not be clamped into the gap between the two end surfaces.

The hinge in the embodiment of the present disclosure may be applied to the embodiment of the hinge component in the present disclosure, and not be limited herein. In other embodiments, it may also be applied to other hinge components, or a direct connection of two components that need to be rotatably connected.

It should be noted that the above description of the hinge component of the glasses is only a specific example, and should not be regarded as the only feasible implementation solution. Obviously, for those skilled in the art, after understanding the basic principle of the hinge component of glasses, it may be possible to make various modifications and changes in the form and details of the specific method and operation of implementing the hinge component of the glasses without departing from these principles, but these modifications and changes are still within the scope described above. For example, the sectional shape of the hinge mount 31 and the hinge chamber 41 may be circular, oval, trapezoidal, or the like. AH such variations may be within the protection scope of the present disclosure.

In typical cases, the sound quality of the speaker may be affected by various factors such as the physical properties of components of the speaker, vibration transmission relationship(s) between the components, a vibration transmission relationship between the speaker and the outside, and the efficiency of a vibration transmission system when vibration is transmitted. The components of the speaker may include a component that generates the vibration (e.g., but is not limited to a transducing device), a component that fixes the speaker (e.g., but is not limited to a glasses rim), and a component that transmits the vibration (e.g., but is not limited to a panel, a vibration transmission layer, etc.). The vibration transmission relationship(s) between the components and the vibration transmission relationship between the speaker and the outside may be determined by a contact mode (e.g., but is not limited to, a clamping force, a contact area, a contact shape, etc.) between the speaker and the user.

Figure 16:
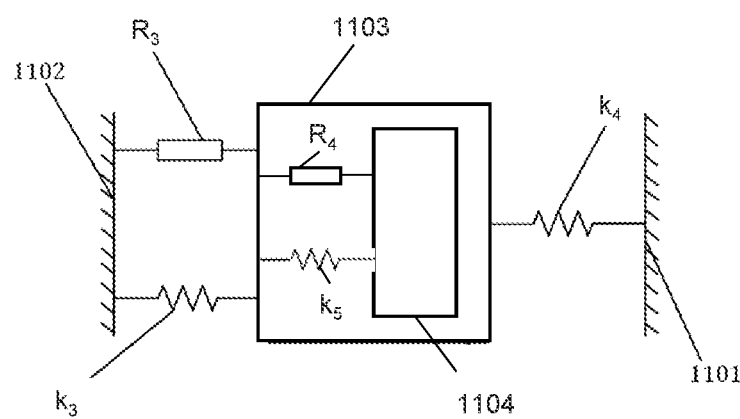
FIG. 16 is an equivalent model illustrating a vibration generation and transmission system of a speaker according to some embodiments of the present disclosure.

For the purpose of illustration only, relationship(s) between the sound quality and the components of the bone conduction speaker may be further described below based on the speaker. It may need to be known that the contents described below may also be applied to an air conduction speaker without violating the principle. FIG. 16 is an equivalent model illustrating a vibration generation and transmission system of a speaker according to some embodiments of the present disclosure. As shown in FIG. 16, it may include a fixed end 1101, a sensing terminal 1102, a vibration unit 1103, and a transducing device 1104. As used herein, the fixed end 1101 may be connected to the vibration unit 1103 based on a transmission relationship K1 ($k_4$ in FIG. 16). The sensing terminal 1102 may be connected to the vibration unit 1103 based on a transmission relationship K2 ($R_3$, $k_3$ in FIG. 16), The vibration unit 1103 may be connected to the transducing device 1104 based on a transmission relationship K3 ($R_4$, $k_5$ in FIG. 16).

The vibration unit mentioned herein may be a vibrating body including a panel and a transducing device. The transmission relationships K1, K2, and K3 may be descriptions of functional relationships between corresponding portions of an equivalent system of the speaker (described in detail below). The vibration equation of the equivalent system may be expressed as:

$$m_3 x_3'' + R_3 x_3' - R_4 x_4' + (k_3 + k_4) x_3 + k_5(x_3 - x_4) = f_3 \quad (1)$$

$$m_4 x_4'' + R_4 x_4'' - k_5(x_3 - x_4) = f_4 \quad (2)$$

As used herein, $m_3$ is an equivalent mass of the vibration unit 1103, $m_4$ is an equivalent mass of the transducing device 1104, $x_3$ is an equivalent displacement of the vibration unit 1103, $x_4$ is an equivalent displacement of the transducing device 1104, $k_3$ is an equivalent elastic coefficient between the sensing terminal 1102 and the vibration unit 1103, $k_4$ is an equivalent elastic coefficient between the fixed end 1101 and the vibration unit 1103, $k_5$ is an equivalent elastic coefficient between the transducing device 1104 and the vibration unit 1103, $R_3$ is an equivalent damping between sensing terminal 1102 and vibration unit 1103, $R_4$ is an equivalent damping between the transducing device 1104 and the vibration unit 1103, and $f_3$ and $f_4$ are interaction forces between the vibration unit 1103 and the transducing device 1104, respectively. An equivalent amplitude $A_3$ of the vibration unit in the system may be:

$$A_3 = -\frac{m_4 \omega^2}{(m_3 \omega^2 + j\omega R_3 - (k_3 + k_4 + k_5))(m_4 \omega^2 + j\omega R_4 - k_5) - k_5(k_5 - j\omega R_4)} \cdot f_0 \quad (3)$$

As used herein, $f_0$ denotes a driving force unit, $\omega$ denotes a vibration frequency. It may be seen that factors affecting a frequency response of a bone conduction speaker may include a vibration generating portion (e.g., but is not limited to a vibration unit, a transducing device, a housing, and interconnection manners, such as $m_3$, $m_4$, $k_5$, $R_4$, etc., in equation (3)), a vibration transmission portion (e.g., but is not limited to, a contact manner with the skin, and properties of an ear-hook, such as $k_3$, $k_4$, $R_3$, etc., in the equation (3)). The change of structures of the components of the speaker and parameters of connections between the components may change the frequency response and sound quality of the bone conduction speaker. For example, the change of a clamping force may be equivalent to changing the size of $k_4$. The change of a bonding manner of glue may be equivalent to changing the size of $R_4$ and $k_5$. The change of the hardness, elasticity, damping, etc., of a relevant material may be equivalent to changing the size of $k_3$ and $R_3$.

In a specific embodiment, the fixed end 1101 may be points or regions relatively fixed in the bone conduction speaker during the vibration. These points or regions may be regarded as the fixed end of the bone conduction speaker during the vibration. The fixed end may constitute a specific component, or a position determined according to the overall structure of the bone conduction speaker. For example, the bone conduction speaker may be hung, bonded, or adsorbed near human ears by a specific device. The structure and shape of the bone conduction speaker may be designed so that a bone conduction part may be attached to the human skin.

The sensing terminal 1102 may be a hearing system for the human body to receive sound signal(s). The vibration unit 1103 may be portions of the bone conduction speaker for protecting, supporting, and connecting the transducing device, including portions that directly or indirectly contact the user, such as a vibration transmission layer or panel that transmits the vibration to the user, a housing that protects and supports other vibration-generating units, etc. The transducing device 1104 may be a sound vibration generating device, which may be one or more the transducing devices discussed above or any combination thereof.

The transmission relationship K1 may connect the fixed end 1101 and the vibration unit 1103, and represent a vibration transmission relationship between a vibration generating portion and the fixed end during the work of the bone conduction speaker. K1 may be determined according to the shape and structure of the bone conduction device. For example, the bone conduction speaker may be fixed to the human head in the form of a U-shaped earphone holder/earphone strap, or installed on a helmet, fire mask or other special-purpose masks, glasses, etc. The shapes and structures of different bone conduction speakers may affect the vibration transmission relationship K1. Further, the structure of the speaker may also include physical properties such as composition materials, qualities, etc., of different portions of the bone conduction speaker. The transmission relationship K2 may connect the sensing terminal 402 and the vibration unit 1103.

K2 may be determined according to the composition of the transmission system. The transmission system may include but be not limited to transmitting sound vibration to the hearing system through tissues of the user. For example, when the sound is transmitted to the hearing system through the skin, subcutaneous tissues, bones, etc., the physical properties of different human tissues and their interconnections may affect K2. Further, the vibration unit 1103 may be in contact with the human tissue. In different embodiments, a contact surface on the vibration unit may be a side of a vibration transmission layer or panel. A surface shape, size of the contact surface, and an interaction force with the human tissue may affect the transmission relationship K2.

The transmission relationship K3 between the vibration unit 1103 and the transducing device 1104 may be determined by connection properties inside the vibration generating device of the bone conduction speaker. The transducing device and the vibration unit may be connected in a rigid or elastic manner. Alternatively, the change of a relative position of a connecting piece between the transducing device and the vibration unit may change the transmission device to transmit the vibration to the vibrating unit (in particular, the transmission efficiency of the panel), thereby affecting the transmission relationship K3.

During the use of the bone conduction speaker, the sound generation and transmission process may affect the final sound quality felt by the human body. For example, the above-mentioned fixed end, the human sensing terminal, the vibration unit, the transducing device, and the transmission relationships K1, K2, and K3, etc., may all affect the sound quality of the bone conduction speaker. It should be noted that K1, K2, and K3 are only a representation of the connection modes of different device portions or systems involved in the vibration transmission process, and may include, but be not limited to, a physical connection manner, a force transmission manner, the sound transmission efficiency, or the like.

It should be noted that the above description of the equivalent system of bone conduction speaker is only a specific example, and should not be regarded as the only feasible implementation solution. Obviously, for those skilled in the art, after understanding the basic principle of the bone conduction speaker, it may be possible to make various modifications and changes in the form and details of the specific method and operation of implementing the bone conduction speaker without departing from these principles, but these modifications and changes are still within the scope described above. For example, the above-mentioned K1, K2, and K3 may be simple vibrations or mechanical transmission modes. Or, the above-mentioned K1, K2, and K3 may include a complex nonlinear transmission system. The transmission relationship may be formed by a direct connection of each part or transmitted through a non-contact mode.

Figure 17:
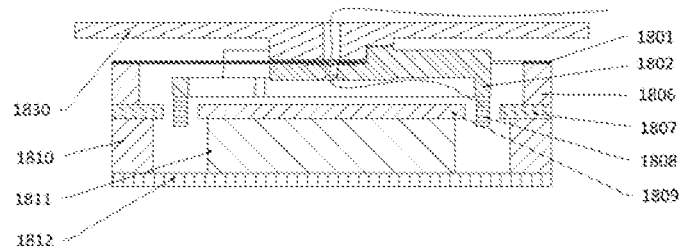
FIG. 17 is a structural diagram illustrating a composite vibration device of a speaker disposed according to an embodiment of the present disclosure.

FIG. 17 is a structural diagram illustrating a composite vibration device of a speaker according to some embodiments of the present disclosure.

Figure 18:
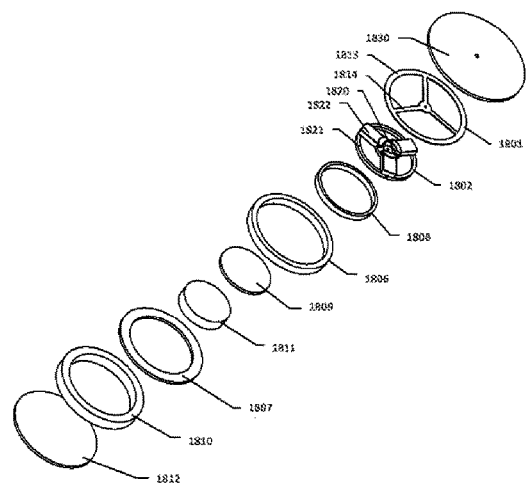
FIG. 18 is a structural diagram illustrating a composite vibration device of a speaker according to an embodiment of the present disclosure.
Figure 19:
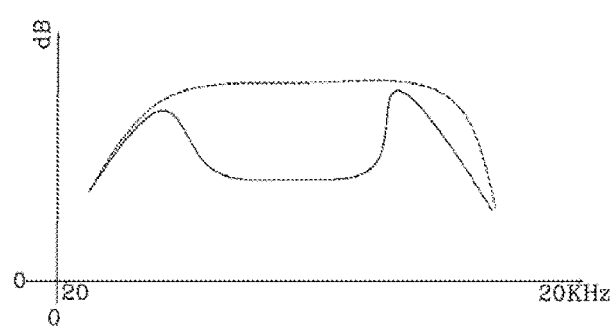
FIG. 19 is a schematic diagram illustrating a frequency response curve of a speaker according to an embodiment of the present disclosure.

In some embodiments, the composite vibration device may be disposed on glasses. In some embodiments, the composite vibration device in FIG. 17 may be a vibration portion that provides a sound inside an earphone core. Specifically, the composite vibration device in some embodiments of the present disclosure may be equivalent to a specific representation of the transmission relationship K3 of the vibration unit 1103 and the transducing device 1104 in FIG. 16. Embodiments of the composite vibration device of the speaker may be shown in FIG. 17 and FIG. 18. A vibration transmission plate 1801 and a vibration plate 1802 may form the composite vibration device. The vibration transmission plate 1801 may be disposed as a first annular body 1813. The first annular body may be disposed with three first supporting rods 1814 converged towards a center. A center position of the converged center may be fixed at the center of the vibration plate 1802. The center of the vibration plate 1802 may be a groove 1820 matching the converged center and the first support rods. The vibration plate 1802 may be disposed with a second annular body 1821 having a radius different from that of the vibration transmission plate 1801, and three second supporting rods 1822 having different thicknesses from that of the first supporting rod 1814. During assembly, the first supporting rods 1814 and the second supporting rods 1822 may be staggered and shown an angle being but be not limited to 60 degrees.

The first and second supporting rods may both be straight rods or other shapes that meet specific requirements. The count of supporting rods may be more than two, and symmetrical or asymmetrical arrangement may be adapted to meet requirements of economy and practical effects. The vibration transmission plate 1801 may have a thin thickness and be able to increase an elastic force. The vibration transmission plate 1801 may be clamped in the center of the groove 1820 of the vibration plate 1802. A voice coil 1808 may be attached to a lower side of the second annular body 1821 of the vibration plate 1802. The composite vibration device may further include a bottom plate 1812. The bottom plate 1812 may be disposed with an annular magnet 1810. An inner magnet 1811 may be concentrically disposed in the annular magnet 1810. An inner magnetic conduction plate 1809 may be disposed on the top surface of the inner magnet 1811. An annular magnetic conduction plate 1807 may be disposed on the annular magnet 1810. A washer 1806 may be fixedly disposed above the annular magnetic conduction plate 1807, The first annular body 1813 of the vibration transmission plate 1801 may be fixedly connected to the washer 1806. The entire composite vibration device may be connected to the outside through a panel 1830. The panel 1830 may be fixedly connected to the converged center of the vibration transmission plate 1801, and fixed to the center of the vibration transmission plate 1801 and the vibration plate 1802. Using the composite vibration device constituting the vibrating plate and the vibration transmission plate, a frequency response shown in FIG. 18 may be obtained and two formants may be generated. By adjusting parameters such as sizes and materials of the two components, the formants may appear at different positions. For example, a low-frequency formant may appear at a position shifted at a lower frequency, and/or a high-frequency formant may appear at a position at a higher frequency, Preferably, a stiffness coefficient of the vibration plate may be greater than a stiffness coefficient of the vibration transmission plate. The vibration plate may generate the high-frequency formant in the two formants, and the vibration transmission plate may generate the low-frequency formant in the two formants. The range of the formants may be set within a frequency range of sounds audible to the human ear, and may also be not in the range. Preferably, neither of the formants may be within the frequency range of the sounds audible to the human ear. More preferably, one formant may be within the frequency range of the sounds audible to the human ear, and another formant may be out of the frequency range of the sounds audible to the human ear. More preferably, both formants may be within the frequency range of the sounds audible to the human ear. And further preferably, both formants may be within the frequency range of the sounds audible to the human ear, and peak frequencies of the two formants may be between 80 Hz-18000 Hz. Further preferably, both formants may be within the frequency range of the sounds audible to the human ear, and the peak frequencies of the two formants may be between 200 Hz-15000 Hz. Further preferably, both formants may be within the frequency range of the sounds audible to the human ear, and the peak frequencies of the two formants may be between 500 Hz-12000 Hz. Further preferably, both formants may be within the frequency range of the sounds audible to the human ear, and the peak frequencies of the two formants may be between 800 Hz-11000 Hz. It may be better to have a certain difference between the two peak frequencies of the two formants. For example, the difference between the two peak frequencies of the two formants may be larger than or equal to 500 Hz, Preferably, the difference between the two peak frequencies of the two formants may be larger than or equal to 1000 Hz. More preferably, the difference between the two peak frequencies of the two formants may be larger than or equal to 2000 Hz. More preferably, the difference between the two peak frequencies of the two formants may be larger than or equal to 5000 Hz. To achieve a better effect, both formants may be within the frequency range of the sounds audible to the human ear, and the difference between the two peak frequencies of the two formants may be larger than or equal to 500 Hz. Preferably, both formants may be within the frequency range of the sounds audible to the human ear, and the difference between the two peak frequencies of the two formants may be larger than or equal to 1000 Hz. More preferably, both formants may be within the frequency range of the sounds audible to the human ear, and the difference between the two peak frequencies of the two formants may be larger than or equal to 2000 Hz. And more preferably, both formants may be within the frequency range of the sounds audible to the human ear, and the difference between the two peak frequencies of the two formants may be larger than or equal to 3000 Hz. Further preferably, both formants may be within the frequency range of the sounds audible to the human ear, and the difference between the two peak frequencies of the two formants may be larger than or equal to 4000 Hz. One of the two formants may be within the frequency range of the sounds audible to the human ear, another formant may be out of the frequency range of the sounds audible to the human ear, and the difference between the two peak frequencies of the two formants may be larger than or equal to 500 Hz. Preferably, one of the two formants may be within the frequency range of the sounds audible to the human ear, another formant may be out of the frequency range of the sounds audible to the human ear, and the difference between the two peak frequencies of the two formants may be larger than or equal to 1000 Hz. More preferably, one of the two formants may be within the frequency range of the sounds audible to the human ear, another formant may be out of the frequency range of the sounds audible to the human ear, and the difference between the two peak frequencies of the two formants may be larger than or equal to 2000 Hz. Further preferably, one of the two formants may be within the frequency range of the sounds audible to the human ear, another formant may be out of the frequency range of the sounds audible to the human ear, and the difference between the two peak frequencies of the two formants may be larger than or equal to 3000 Hz. Further preferably, one of the two formants may be within the frequency range of the sounds audible to the human ear, another formant may be out of the frequency range of the sounds audible to the human ear, and the difference between the two peak frequencies of the two formants may be larger than or equal to 4000 Hz. Frequencies of both formants may be between 5 Hz-30000 Hz, and the difference between the two peak frequencies of the two formants may be larger than or equal to 400 Hz. Preferably, the frequencies of both formants may be between 5 Hz-30000 Hz, and the difference between the two peak frequencies of the two formants may be larger than or equal to 1000 Hz. More preferably, the frequencies of both formants may be between 5 Hz-30000 Hz, and the difference between the two peak frequencies of the two formants may be larger than or equal to 2000 Hz. Further preferably, the frequencies of both formants may be between 5 Hz-30000 Hz. and the difference between the two peak frequencies of the two formants may be larger than or equal to 3000 Hz. Further preferably, the frequencies of both formants may be between 5 Hz-30000 Hz, and the difference between the two peak frequencies of the two formants may be larger than or equal to 4000 Hz. The frequencies of both formants may be between 20 Hz-20000 Hz, and the difference between the two peak frequencies of the two formants may be larger than or equal to 400 Hz. Preferably, the frequencies of both formants may be between 20 Hz-20000 Hz, and the difference between the two peak frequencies of the two formants may be larger than or equal to 1000 Hz. More preferably, the frequencies of both formants may be between 20 Hz-20000 Hz, and the difference between the two peak frequencies of the two formants may be larger than or equal to 2000 Hz. Further preferably, the frequencies of both formants may be between 20 Hz-20000 Hz, and the difference between the two peak frequencies of the two formants may be larger than or equal to 3000 Hz. Further preferably, the frequencies of both formants may be between 20 Hz-20000 Hz, and the difference between the two peak frequencies of the two formants may be larger than or equal to 4000 Hz. The frequencies of both formants may be between 100 Hz-18000 Hz, and the difference between the two peak frequencies of the two formants may be larger than or equal to 400 Hz. Preferably, the frequencies of both formants may be between 100 Hz-18000 Hz. and the difference between the two peak frequencies of the two formants may be larger than or equal to 1000 Hz. More preferably, the frequencies of both formants may be between 100 Hz-18000 Hz, and the difference between the two peak frequencies of the two formants may be larger than or equal to 2000 Hz. Further preferably, the frequencies of both formants may be between 100 Hz-18000 Hz, and the difference between the two peak frequencies of the two formants may be larger than or equal to 3000 Hz. Further preferably, the frequencies of both formants may be between 100 Hz-18000 Hz, and the difference between the two peak frequencies of the two formants may be larger than or equal to 4000 Hz. The frequencies of both formants may be between 200 Hz-12000 Hz. and the difference between the two peak frequencies of the two formants may be larger than or equal to 400 Hz. Preferably, the frequencies of both formants may be between 200 Hz-12000 Hz, and the difference between the two peak frequencies of the two formants may be larger than or equal to 1000 Hz. More preferably, the frequencies of both formants may be between 200 Hz-12000 Hz, and the difference between the two peak frequencies of the two formants may be larger than or equal to 2000 Hz. Further preferably, the frequencies of both formants may be between 200 Hz-12000 Hz, and the difference between the two peak frequencies of the two formants may be larger than or equal to 3000 Hz. Further preferably, the frequencies of both formants may be between 200 Hz-12000 Hz, and the difference between the two peak frequencies of the two formants may be larger than or equal to 4000 Hz. The frequencies of both formants may be between 500 Hz-10000 Hz, and the difference between the two peak frequencies of the two formants may be larger than or equal to 400 Hz. Preferably, the frequencies of both formants may be between 500 Hz-10000 Hz, and the difference between the two peak frequencies of the two formants may be larger than or equal to 1000 Hz. More preferably, the frequencies of both formants may be between 500 Hz-10000 Hz, and the difference between the two peak frequencies of the two formants may be larger than or equal to 2000 Hz. Further preferably, the frequencies of both formants may be between 500 Hz-10000 Hz, and the difference between the two peak frequencies of the two formants may be larger than or equal to 3000 Hz. Further preferably, the frequencies of both formants may be between 500 Hz-10000 Hz, and the difference between the two peak frequencies of the two formants may be larger than or equal to 4000 Hz. In this way, a formant response range of the speaker may be widened, thereby obtaining the formant whose sound quality satisfies requirements. It should be noted that, in actual use, a plurality of vibration transmission plates and vibration plates may be provided to form a multi-layer vibration structure. The multi-layer vibration structure may correspond to different frequency response ranges, respectively, thereby realizing a vibration of the speaker with full-range, full-frequency response, and high quality, or make a frequency response curve meet requirements of usage in some specific frequency range. For example, in a bone conduction hearing aid, in order to meet requirements of normal hearing, a transducing device composed of one or more vibration plates and vibration transmission plates with a formant frequency in a range of 100 Hz-10000 Hz may be selected. The descriptions of the composite vibration device constituting the vibration plate and the vibration transmission plate may be found in a patent application named "Bone conduction speaker and composite vibration device thereof" disclosed in Chinese Patent Application No, 201110438083.9, filed on Dec. 23, 2011, which are hereby incorporated by reference in its entirety.

Figure 20:
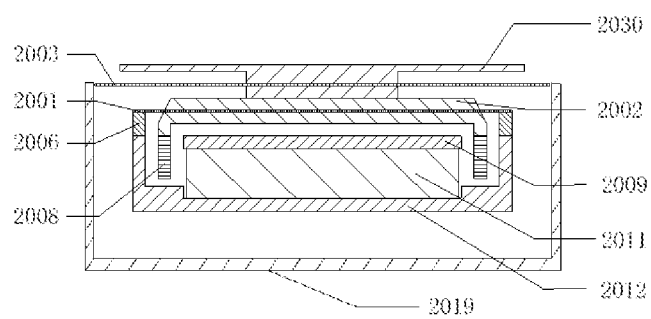
FIG. 20 is a structural diagram illustrating a composite vibration device of a speaker according to some embodiments in the present disclosure.

FIG. 20 is a structural diagram illustrating a composite vibration device of a speaker according to some embodiments of the present disclosure. In some embodiments, an earphone core may include the composite vibration device. In another embodiment, as shown in FIG. 20, the composite vibration device of the speaker may include a vibration plate 2002, a first vibration transmission plate 2003, and a second vibration transmission plate 2001. The first vibration transmission plate 2003 may fix the vibration plate 2002 and the second vibration transmission plate 2001 on a core housing 2219. The composite vibration device constituted by the vibration plate 2002, the first vibration transmission plate 2003, and the second vibration transmission plate 2001 may generate not less than two formants. A flatter frequency response curve may be generated within an audible range of a hearing system, thereby improving the sound quality of the speaker.

Figure 21:
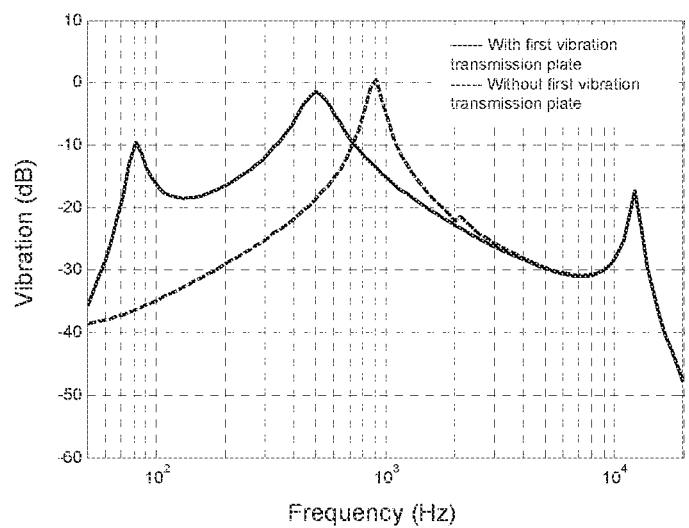
FIG. 21 is a schematic diagram illustrating a vibration response curve of a speaker according to some embodiments of the present disclosure.

The count of formants generated in a triple composite vibration system of the first vibration transmission plate may be greater than that of a composite vibration system without the first vibration transmission plate. Preferably, the triple composite vibration system may generate at least three formants. More preferably, at least one formant may not be within the range audible to the human ear. More preferably, the formants may be all within the range audible to the human ear. And further preferably, all formants may be within the frequency range of the sounds audible to the human ear, and peak frequencies of the formants may be less than or equal to 18000 Hz. Further preferably, all the formants may be within the frequency range of the sounds audible to the human ear, and the peak frequencies of the formants may be between 100 Hz-15000 Hz. Further preferably, all the formants may be within the frequency range of the sounds audible to the human ear, and the peak frequencies of the formants may be between 200 Hz-12000 Hz. Further preferably, all the formants may be within the frequency range of the sounds audible to the human ear, and the peak frequencies of the formants may be between 500 Hz-11000 Hz. It may be better to have a certain difference between the peak frequencies of the formants. For example, there may be at least two formants with a peak frequency difference larger than or equal to 500 Hz. Preferably, there may be at least two formants with a peak frequency difference larger than or equal to 1000 Hz. More preferably, there may be at least two formants with a peak frequency difference larger than or equal to 2000 Hz. More preferably, there may be at least two formants with a peak frequency difference larger than or equal to 5000 Hz. To achieve a better effect, all the formants may be within the frequency range of the sounds audible to the human ear, and there may be at least two formants with a peak frequency difference larger than or equal to 500 Hz. Preferably, all the formants may be within the frequency range of the sounds audible to the human ear, and there may be at least two formants with a peak frequency difference larger than or equal to 1000 Hz. More preferably, all the formants may be within the frequency range of the sounds audible to the human ear, and there may be at least two formants with a peak frequency difference larger than or equal to 2000 Hz. And more preferably, all the formants may be within the frequency range of the sounds audible to the human ear, and there may be at least two formants with a peak frequency difference larger than or equal to 3000 Hz. Further preferably, all the formants may be within the frequency range of the sounds audible to the human ear, and there may be at least two formants with a peak frequency difference larger than or equal to 4000 Hz. Two of the formants may be within the frequency range of the sounds audible to the human ear, another formant may be out of the frequency range of the sounds audible to the human ear, and there may be at least two formants with a peak frequency difference larger than or equal to 500 Hz. Preferably, two of the formants may be within the frequency range of the sounds audible to the human ear, another formant may be out of the frequency range of the sounds audible to the human ear, and there may be at least two formants with a peak frequency difference larger than or equal to 1000 Hz, More preferably, two of the formants may be within the frequency range of the sounds audible to the human ear, another formant may be out of the frequency range of the sounds audible to the human ear, and there may be at least two formants with a peak frequency difference larger than or equal to 2000 Hz. Further preferably, two of the formants may be within the frequency range of the sounds audible to the human ear, another formant may be out of the frequency range of the sounds audible to the human ear, and there may be at least two formants with a peak frequency difference larger than or equal to 3000 Hz. Further preferably, two of the formants may be within the frequency range of the sounds audible to the human ear, another formant may be out of the frequency range of the sounds audible to the human ear, and there may be at least two formants with a peak frequency difference larger than or equal to 4000 Hz. One of the formants may be within the frequency range of the sounds audible to the human ear, two other formants may be out of the frequency range of the sounds audible to the human ear, and there may be at least two formants with a peak frequency difference larger than or equal to 500 Hz. Preferably, one of the formants may be within the frequency range of the sounds audible to the human ear, two other formants may be out of the frequency range of the sounds audible to the human ear, and there may be at least two formants with a peak frequency difference larger than or equal to 1000 Hz. More preferably, one of the formants may be within the frequency range of the sounds audible to the human ear, two other formants may be out of the frequency range of the sounds audible to the human ear, and there may be at least two formants with a peak frequency difference larger than or equal to 2000 Hz. Further preferably, one of the formants may be within the frequency range of the sounds audible to the human ear, two other formants may be out of the frequency range of the sounds audible to the human ear, and there may be at least two formants with a peak frequency difference larger than or equal to 3000 Hz. Further preferably, one of the formants may be within the frequency range of the sounds audible to the human ear, two other formants may be out of the frequency range of the sounds audible to the human ear, and there may be at least two formants with a peak frequency difference larger than or equal to 4000 Hz. Frequencies of all the formants may be between 5 Hz-30000 Hz, and there may be at least two formants with a peak frequency difference larger than or equal to 400 Hz. Preferably, the frequencies of all the formants may be between 5 Hz-30000 Hz, and there may be at least two formants with a peak frequency difference larger than or equal to 1000 Hz. More preferably, the frequencies of all the formants may be between 5 Hz-30000 Hz, and there may be at least two formants with a peak frequency difference larger than or equal to 2000 Hz. Further preferably, the frequencies of all the formants may be between 5 Hz-30000 Hz, and there may be at least two formants with a peak frequency difference larger than or equal to 3000 Hz. Further preferably, the frequencies of all the formants may be between 5 Hz-30000 Hz, and there may be at least two formants with a peak frequency difference larger than or equal to 4000 Hz. The frequencies of all the formants may be between 20 Hz-20000 Hz, and there may be at least two formants with a peak frequency difference larger than or equal to 400 Hz. Preferably, the frequencies of all the formants may be between 20 Hz-20000 Hz, and there may be at least two formants with a peak frequency difference larger than or equal to 1000 Hz. More preferably, the frequencies of all the formants may be between 20 Hz-20000 Hz, and there may be at least two formants with a peak frequency difference larger than or equal to 2000 Hz. Further preferably, the frequencies of all the formants may be between 20 Hz-20000 Hz, and there may be at least two formants with a peak frequency difference larger than or equal to 3000 Hz. Further preferably, the frequencies of all the formants may be between 20 Hz-20000 Hz, and there may be at least two formants with a peak frequency difference larger than or equal to 4000 Hz. The frequencies of all the formants may be between 100 Hz-18000 Hz, and there may be at least two formants with a peak frequency difference larger than or equal to 400 Hz. Preferably, the frequencies of all the formants may be between 100 Hz-18000 Hz, and there may be at least two formants with a peak frequency difference larger than or equal to 1000 Hz. More preferably, the frequencies of all the formants may be between 100 Hz-18000 Hz, and there may be at least two formants with a peak frequency difference larger than or equal to 2000 Hz. Further preferably, the frequencies of all the formants may be between 100 Hz-18000 Hz, and there may be at least two formants with a peak frequency difference larger than or equal to 3000 Hz. Further preferably, the frequencies of all the formants may be between 100 Hz-18000 Hz, and there may be at least two formants with a peak frequency difference larger than or equal to 4000 Hz. The frequencies of all the formants may be between 200 Hz-12000 Hz, and there may be at least two formants with a peak frequency difference larger than or equal to 400 Hz. Preferably, the frequencies of all the formants may be between 200 Hz-12000 Hz, and there may be at least two formants with a peak frequency difference larger than or equal to 1000 Hz. More preferably, the frequencies of all the formants may be between 200 Hz-12000 Hz, and there may be at least two formants with a peak frequency difference larger than or equal to 2000 Hz. Further preferably, the frequencies of all the formants may be between 200 Hz-12000 Hz, and there may be at least two formants with a peak frequency difference larger than or equal to 3000 Hz. Further preferably, the frequencies of all the formants may be between 200 Hz-12000 Hz, and there may be at least two formants with a peak frequency difference larger than or equal to 4000 Hz. The frequencies of all the formants may be between 500 Hz-10000 Hz, and there may be at least two formants with a peak frequency difference larger than or equal to 400 Hz. Preferably, the frequencies of all the formants may be between 500 Hz-10000 Hz, and there may be at least two formants with a peak frequency difference larger than or equal to 1000 Hz. More preferably, the frequencies of all the formants may be between 500 Hz-10000 Hz, and there may be at least two formants with a peak frequency difference larger than or equal to 2000 Hz. Further preferably, the frequencies of all the formants may be between 500 Hz-10000 Hz, and there may be at least two formants with a peak frequency difference larger than or equal to 3000 Hz. Further preferably, the frequencies of all the formants may be between 500 Hz-10000 Hz, and there may be at least two formants with a peak frequency difference larger than or equal to 4000 Hz. In one embodiment, by using the triple composite vibration system constituted by the vibration plate, the first vibration transmission plate, and the second vibration transmission plate, the frequency response shown in FIG. 21 may be obtained, resulting in three distinct formants, so that the sensitivity of the frequency response of the speaker in the low frequency range (about 600 Hz) may be greatly improved, and the sound quality may be improved.

By changing parameters such as the size and material of the first vibration transmission plate, the formant(s) may be shifted to obtain an ideal frequency response. Preferably, the first vibration transmission plate may be an elastic plate. The elasticity may be determined by various aspects such as the material, thickness, and structure of the first vibration transmission plate. The material of the first vibration transmission plate may be, but be not limited to, steel (such as, but is not limited to, stainless steel, carbon steel, etc.), a light alloy (such as, but is not limited to, an aluminum alloy, a beryllium copper, a magnesium alloy, a titanium alloy, etc.), plastics (such as, but being is limited to, high-molecular polyethylene, blown nylon, engineering plastics, etc.), other single or composite materials capable of implementing the same performance. The composite materials may be but be not limited to a reinforcing material, for example, glass fiber, carbon fiber, boron fiber, graphite fiber, grapheme fiber, silicon carbide fiber, aramid fiber, etc. The composite materials may also be a composite of other organic and/or inorganic materials, such as various types of glass steels constituted by glass fiber reinforcing unsaturated polyester, epoxy resin, or phenolic resin. The thickness of the first vibration transmission plate may not be less than 0.005 mm. Preferably, the thickness may be 0.005 mm to 3 mm. More preferably, the thickness may be 0.01 mm to 2 mm. Still more preferably, the thickness may be 0.01 mm to 1 mm. Further preferably, the thickness may be 0.02 mm to 0.5 mm. The structure of the first vibration transmission plate may be disposed in a ring shape, and preferably include at least one ring. Preferably, the structure may include at least two rings, which may be concentric rings or non-concentric rings. The rings may be connected by at least two supporting rods that centrally radiate from the outer ring to the inner ring. Further preferably, the structure may include at least one elliptical ring. Further preferably, the structure may include at least two elliptical rings. Different elliptical rings may have a different radius of curvature. The rings may be connected by the supporting rods. Still further preferably, the first vibration transmission plate may include at least one square ring. The structure of the first vibration transmission plate may also be disposed in a plate shape. Preferably, a hollow pattern may be disposed on the first vibration transmission plate, and the area of the hollow pattern may not be less than the area without a hollow pattern. The material, thickness, and structure described above may be combined to form different vibration transmission plates. For example, the ring-shaped vibration transmission plate may have different thickness distributions. Preferably, the thickness of the supporting rod may be equal to the thickness of the ring. Further preferably, the thickness of the supporting rod may be greater than the thickness of the ring. More preferably, the thickness of the inner ring may be greater than the thickness of the outer ring.

Figure 22:
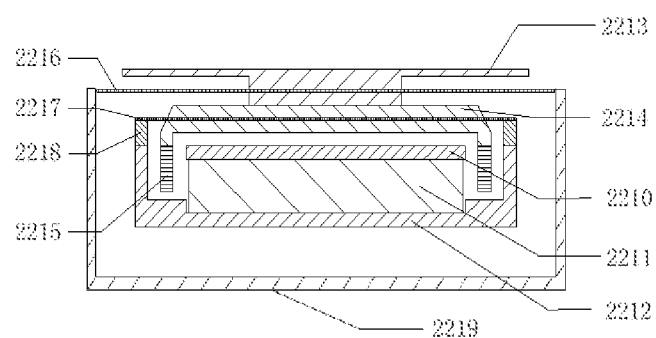
FIG. 22 is a structural diagram illustrating a vibration generating portion of a speaker according to some embodiments of the present disclosure.

The content disclosed in the present disclosure may also disclose specific embodiments of the vibration plate, the first vibration transmitting piece, and the second vibration transmitting piece described above. FIG. 22 is a structural diagram illustrating a vibration generating portion of a speaker according to some embodiments of the present disclosure. As shown in FIG. 22, a transducing device may include a magnetic circuit system constituted by a magnetic conduction plate 2210, a magnetic system constituted by a magnet 2211 and a magnetizer 2212, a vibration plate 2214, a coil 2215, a first vibration transmission plate 2216, and a second vibration transmission plate 2217. A panel 2213 may protrude from a core housing 2219, and be bonded to the vibration plate 2214 by glue. The first vibration transmission plate 2216 may connect and fix the transducing device on the core housing 2219 to form a suspension structure.

Figure 23:
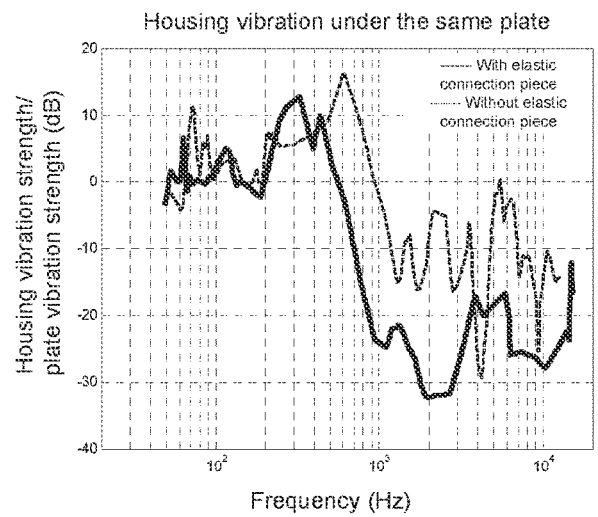
FIG. 23 is a schematic diagram illustrating a vibration response curve of a vibration generating portion of a speaker according to some embodiments of the present disclosure.
Figure 24:
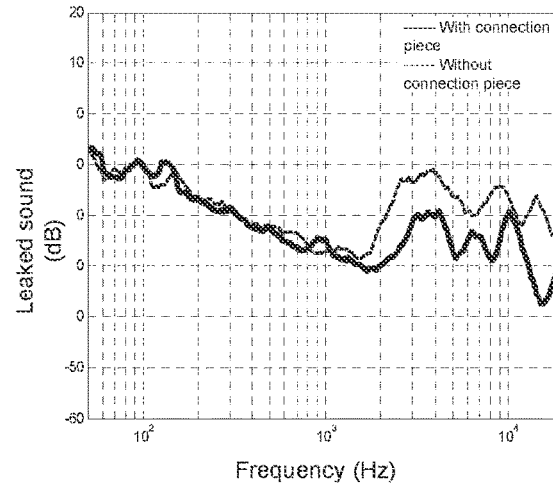
FIG. 24 is a schematic diagram illustrating a vibration response curve of a vibration generating portion of a speaker according to some embodiments of the present disclosure.

During the working of the speaker, a triple vibration system constituted by the vibration plate 2214, the first vibration transmission plate 2216, and the second vibration transmission plate 2217 may generate a flatter frequency response curve, thereby improving the sound quality of the speaker. The first vibration transmission plate 2216 may elastically connect the transducing device to the core housing 2219, which may reduce the vibration transmitted by the transducing device to the housing, thereby effectively reducing a leaked sound caused by the vibration of the housing, and also reducing the influence of the vibration of the housing on the sound quality of the speaker. FIG. 23 is a schematic diagram illustrating a vibration response curve of a vibration intensity of a housing and a vibration intensity of a panel with frequency according to some embodiments of the present disclosure. As used herein, the thick line may show the frequency response of the vibration generating portion when the first vibration transmission plate 2216 is used, and the thin line may show the frequency response of the vibration generating portion when the first vibration transmission plate 2216 is not used. It may be seen that the vibration of the housing of the speaker without the first vibration transmission plate 2216 may be significantly greater than the vibration of the housing of the speaker with the first vibration transmission plate 2216 in a frequency range above 500 Hz. FIG. 24 is a comparison of a leaked sound in a case of including the first vibration transmission plate 2216 and a case of excluding the first vibration transmission plate 2216, As used herein, the leaked sound of the device with the first vibration transmission plate 2216 in an intermediate frequency (e.g., about 1000 Hz) may be less than the leaked sound of the device without the first vibration transmission plate 2216 in the corresponding frequency range. It may be seen that the vibration of the housing may be effectively reduced after using the first vibration transmission plate between the panel and the housing, thereby reducing the leaked sound. In some embodiments, the first vibration transmission plate may include, but be not limited to, stainless steel, beryllium copper, plastics, a polycarbonate material, or the like. The thickness may be in a range of 0.01 mm-1 mm.

It should be noted that the above description of the speaker is only a specific example, and should not be regarded as the only feasible implementation solution. Obviously, for those skilled in the art, after understanding the basic principle of the speaker, it may be possible to make various modifications and changes in the form and details of the specific method and operation of implementing the speaker without departing from these principles, but these modifications and changes are still within the scope described above. For example, the first vibration transmission plate may not be limited to the one or two rings. The count of the rings may be more than two. As another example, shapes of the plurality of elements of the first vibration transmission plate may be the same or different (a shape of an element including a circular ring and a square ring). All such variations may be within the protection scope of the present disclosure.

Figure 25A:
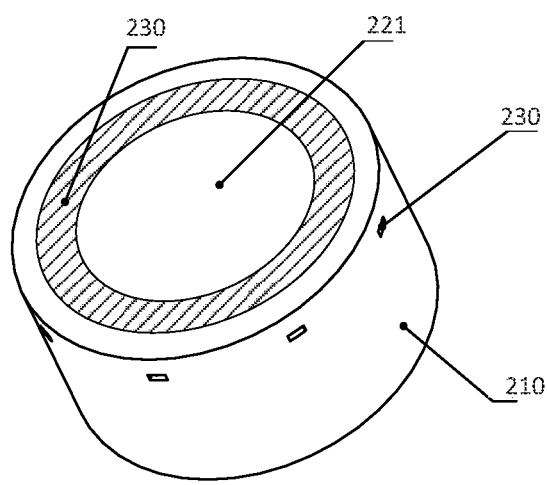
FIG. 25A is a schematic diagram illustrating a structure of a speaker according to some embodiments of the present disclosure.
Figure 25B:
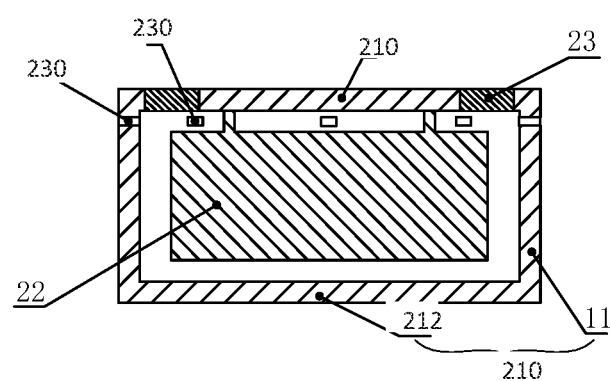
FIG. 25B is a schematic diagram illustrating a structure of a speaker according to some embodiments of the present disclosure.

FIGS. 25A and 25B are schematic diagrams of a speaker according to some embodiments of the present disclosure. In the embodiment, the speaker 21 may include a core housing 210, a vibration panel 221, and a transducing device 22 (i.e., an earphone core). In some embodiments, the core housing 210 and the core housing 2219 (FIG. 25) may have a same or similar structure. In some embodiments, the transducing device 22 may be accommodated inside the core housing 210 and generate a vibration. The vibration of the transducing device 22 may cause the core housing 210 to vibrate, thereby pushing the air outside the housing to vibrate and generate a leaked sound. At least one sound guiding hole 230 may be disposed in at least a portion of the core housing 210. The sound guiding hole(s) 230 may be used to lead sound waves in the housing formed by the air vibration inside the core housing 210 to the outside of the core housing 210, and interfere with leaked sound waves formed by the air outside the housing pushed by the vibration of the core housing 210. In some embodiments, the interference may reduce the amplitude of the leaked sound waves.

The vibration panel 221 may be fixedly connected to the transducing device 22, and synchronously vibrated by the transducing device 22. The vibration panel 221 may protrude from the core housing 210 through an opening of the core housing 210, and at least partially fit human skins. The vibration may be transmitted to auditory nerves through human tissues and bones, so that a person may hear a sound. The transducing device 22 and the core housing 210 may be connected through a connection piece 23. The connection piece 23 may position the transducing device 22 inside the core housing 210.

The connection piece 23 may be one or more independent components, or disposed with the transducing device 22 or the core housing 210 as a whole. In some embodiments, in order to reduce a constraint on the vibration, the connection piece 23 may be made of an elastic material.

In some embodiments, the sound guiding hole(s) 230 may be disposed in an upper portion of the height of a side wall, for example, a portion of the side wall from the top (the vibration panel) to ⅓ height along the height direction.

Taking a cylindrical housing as an example, for the disposing position, the sound guiding hole(s) 230 may be opened in a side wall 211 and/or a bottom wall 212 of the housing according to different requirements. Preferably, the sound guiding hole(s) 230 may be opened in an upper portion and/or a lower portion of the side wall 211 of the housing. The count of sound guiding holes in the side wall 211 of the housing may be at least two, and preferably uniformly distributed in a circularly circumferential direction. The count of sound guiding holes in the bottom wall 212 of the housing may be at least two. With a center of the bottom wall as the center of the ring, the holes may be uniformly distributed in a ring shape. The sound guiding holes distributed in the ring may be disposed as at least one ring. The count of sound guiding holes disposed in the bottom wall 212 of the housing may be only one. The sound guiding holes may be disposed at the center of the bottom wall 212.

As for the count, the sound guiding hole(s) may be one or more, preferably multiple, and evenly arranged. For ring-shaped distributed sound guiding holes, the count of sound guiding holes of each ring may be, for example, 6-8.

The shape of the sound guiding hole may be a ring shape, an oval shape, a rectangular shape, or a long strip shape. The long strip shape may generally refer to a long strip along a straight line, a curve, an arc, or the like. Various shapes of the sound guiding holes on the speaker may be the same or different.

In some embodiments, the penetrating sound guiding hole(s) 230 may be disposed in the lower portion of the side wall of the core housing 210 (a portion of the side wall from ⅔ height to the bottom along the height direction). The count of the sound guiding hole(s) 230 may be, for example, eight, and the shape may be, for example, a rectangle. Each sound guiding hole 230 may be uniformly distributed in a ring shape on the side wall of the core housing 210.

In some embodiments, the core housing 210 may be cylindrical. The penetrating sound guiding hole(s) 230 may be disposed in a middle portion of the side wall of the core housing 210 (a portion of the side wall from ⅓ to ⅔ height along the height direction). The count of the sound guiding hole(s) 230 may be, for example, eight, and the shape may be, for example, a rectangle. Each sound guiding hole 230 may be uniformly distributed in a ring shape on the side wall of the core housing 210.

In some embodiments, the penetrating sound guiding hole(s) 230 may be disposed in a circumferential direction of the bottom wall of the core housing 210. The count of the sound guiding hole(s) 230 may be, for example, eight, and the shape may be, for example, a rectangle. Each sound guiding hole 230 may be uniformly distributed in a ring shape on the side wall of the core housing 210.

In some embodiments, the penetrating sound guiding hole(s) 230 may be respectively formed in the upper and lower portions of the side wall of the core housing 210. The sound guiding hole(s) 230 may be uniformly distributed in the upper portion and the lower portion of the side wall of the core housing 210 in a ring shape. The count of the sound guiding hole(s) 230 of each ring may be eight. In addition, the sound guiding hole(s) 230 disposed at the upper and lower portions may be symmetrically disposed relative to a middle portion of the core housing 210. The shape of each sound guiding hole 230 may be a ring.

In some embodiments, the penetrating sound guiding hole(s) 230 may be disposed in the upper portion and the lower portion of the side wall of the core housing 210, and the bottom wall of the core housing 210, respectively. The sound guiding hole(s) 230 opened on the side wall may be evenly distributed in the upper portion and the lower portion of the side wall of the core housing 210. The count of the hole(s) of each ring may be eight. The sound guiding hole(s) 230 disposed at the upper portion and the lower portion may be symmetrically arranged relative to a middle portion of the core housing 210. Each sound guiding hole 230 opened on the side wall may be rectangular. The shape of the sound guiding hole(s) 230 opened on the bottom wall may be a long strip shape arranged along an arc. The count of the hole(s) may be four. The hole(s) may be uniformly distributed in a ring shape with the center of the bottom wall as the ring center. The sound guiding hole(s) 230 opened on the bottom wall may also include a ring through-hole opened at the center.

In some embodiments, the penetrating sound guiding hole(s) 230 may be opened in the upper portion of the side wall of the core housing 210. The hole(s) may be evenly distributed in the upper portion of the side wall of the core housing 210. The count may be, for example, eight, and the shape of the sound guiding hole(s) 230 may be a ring.

In some embodiments, in order to show a better effect of suppressing leaked sound, the sound guiding holes 230 may be uniformly distributed in the upper portion, the middle portion, and the lower portion of the side wall 11, respectively, and a ring of the sound guiding hole(s) 230 may also be disposed in the bottom wall 12 of the core housing 210 in the circumferential direction. The aperture of each sound guiding hole 230 and the count of the hole(s) may be the same.

In some embodiments, the sound guiding hole 230 may be an unobstructed through-hole.

In order to control the effect of the sound wave propagating from the sound guiding hole(s) 230 in the housing, a damping layer (not shown in the specification drawing) may be disposed at the opening of the sound guiding hole(s) 230 to adjust the phase and amplitude of the sound wave, thereby correcting and guiding the effect of the sound wave in the housing. The material and position of the damping layer may be set in many manners. For example, the damping layer may be made of tuning paper, tuning cotton, non-woven fabric, silk, cotton, sponge, rubber, or other materials with a certain damping for sound quality conduction. The damping layer may be attached to an inner wall of the sound guiding hole(s) 230, or placed on the outside of the sound guiding hole(s) 230.

In some embodiments, corresponding to different sound guiding holes, the disposed damping layer may be disposed to have the same phase difference between the different sound guiding holes 230 to suppress the leaked sound of the same wavelength, or different phase differences between the different sound guiding holes 230 to suppress the leaked sound of different wavelengths (i.e., a specific band of leaked sound).

In some embodiments, different portions of the same sound guiding hole(s) 230 may be disposed to have the same phase (e.g., using a pre-designed step or step-shaped damping layer) to suppress leaked sound waves of the same wavelength. Alternatively, different portions of the same sound guiding hole 230 may be disposed to have different phases to suppress leaked sound waves of different wavelengths.

The transducing device 22 may not only drive the vibration panel 221 to vibrate, but also be a vibration source, which is accommodated inside the core housing 210. The vibration of the surface of the transducing device 22 may cause the air in the housing to vibrate with the surface. Sound waves may be formed inside the core housing 210, which may be referred to as in-housing sound waves. The vibration panel 221 and the transducing device 22 may be located at the core housing 210 through the connection piece 23. It may be inevitable that the vibration may be applied to the core housing 210 to drive the core housing 210 to vibrate synchronously. Therefore, the core housing 210 may push the air outside the housing to vibrate to form the leaked sound wave. The leaked sound wave may propagate outward, forming the leaked sound.

According to the following equation to determine a position of the sound guiding hole to suppress the leaked sound, the reduction of the leaked sound may be proportional to:

$$(\iint_{S_{opening}} P ds - \iint_{S_{housing}} P_d ds) \quad (4)$$

Wherein $S_{opening}$ is an opening area of the sound guiding hole, and $S_{housing}$ is a housing area that is not in contact with the human face.

An in-housing pressure:

$$P = P_a + P_b + P_c + P_e, \quad (5)$$

$P_a$, $P_b$, $P_c$, and $P_e$ are sound pressures generated at any point of a-plane, b-plane, c-plane, and e-plane in the housing space, respectively.

$$P_a(x, y, z) = -j\omega\rho_0 \iint_{S_a} W_a(x'_a, y'_a) \cdot \frac{e^{jkR(x'_a, y'_a)}}{4\pi R(x'_a, y'_a)} dx'_a dy'_a - P_{aR} \quad (6)$$

$$P_b(x, y, z) = -j\omega\rho_0 \iint_{S_b} W_b(x', y') \cdot \frac{e^{jkR(x', y')}}{4\pi R(x', y')} dx' dy' - P_{bR} \quad (7)$$

$$P_c(x, y, z) = -j\omega\rho_0 \iint_{S_c} W_c(x'_c, y'_c) \cdot \frac{e^{jkR(x'_c, y'_c)}}{4\pi R(x'_c, y'_c)} dx'_c dy'_c - P_{cR} \quad (8)$$

$$P_e(x, y, z) = -j\omega\rho_0 \iint_{S_e} W_e(x'_e, y'_e) \cdot \frac{e^{jkR(x'_e, y'_e)}}{4\pi R(x'_e, y'_e)} dx'_e dy'_e - P_{eR} \quad (9)$$

Wherein, $R(x', y') = \sqrt{(x-x')^2 + (y-y')^2 + z^2}$ is the distance from an observation point $(x, y, z)$ to a point $(x', y', 0)$ on a b-plane sound source, $S_a$, $S_b$, $S_c$, and $S_e$ are the areas of a-plane, b-plane, c-plane, and e-plane, respectively,
$R(x'_a, y'_a) = \sqrt{(x-x'_a)^2 + (y-y'_a)^2 + (z-z_a)^2}$ is the distance from the observation point $(x, y, z)$ to a point $(x'_a, y'_a, z_a)$ on a a-plane sound source,
$R(x'_c, y'_c) = \sqrt{(x-x'_c)^2 + (y-y'_c)^2 + (z-z_c)^2}$ is the distance from the observation point $(x, y, z)$ to a point $(x'_c, y'_c, z_c)$ on a c-plane sound source,
$R(x'_e, y'_e) = \sqrt{(x-x'_e)^2 + (y-y'_e)^2 + (z-z_2)^2}$ is the distance from the observation point $(x, y, z)$ to a point $(x'_e, y'_e, z_e)$ on an e-plane sound source, $k = \omega/u$ is a wave count (u may be the speed of sound), $\rho_0$ is a density of air. $\omega$ is an angular frequency of vibration, and $P_{aR}$, $P_{bR}$, $P_{cR}$, and $P_{eR}$ are sound resistances of air itself, which respectively may be:

$$P_{aR} = A \cdot \frac{z_a \cdot r + j\omega \cdot z_a \cdot r'}{\varphi} + \delta \quad (10)$$

$$P_{bR} = A \cdot \frac{z_b \cdot r + j\omega \cdot z_b \cdot r'}{\varphi} + \delta \quad (11)$$

$$P_{cR} = A \cdot \frac{z_c \cdot r + j\omega \cdot z_c \cdot r'}{\varphi} + \delta \quad (12)$$

$$P_{eR} = A \cdot \frac{z_e \cdot r + j\omega \cdot z_e \cdot r'}{\varphi} + \delta \quad (13)$$

Wherein r is a sound damping of each unit length, r' is a sound mass of each unit length, $z_a$ is the distance from the observation point to the a-plane sound source, $z_b$ is the distance from the observation point to the b-plane sound source, $z_c$ is the distance from the observation point to the c-plane sound source, $z_e$ is the distance from the observation point to the e-plane sound source.

$W_a(x, y)$, $W_b(x, y)$, $W_c(x, y)$, $W_e(x, y)$, and $W_d(x, y)$ are sound source intensities of each unit area of the a-plane, b-plane, c-plane, e-plane, and d-plane, and may be derived from the following equation group (14):

$$\begin{cases} F_e = F_a = F - k_1\cos\omega t - \iint_{S_a} W_a(x, y) dx dy - \iint_{S_e} W_e(x, y) dx dy - f \\ F_b = -F + k_1\cos\omega t + \iint_{S_b} W_b(x, y) dx dy - \iint_{S_e} W_e(x, y) dx dy - L \\ F_c = F_d = F_b - k_2\cos\omega t - \iint_{S_c} W_c(x, y) dx dy - f - \gamma \\ F_d = F_b - k_2\cos\omega t - \iint_{S_d} W_d(x, y) dx dy \end{cases} \quad (14)$$

Wherein F is a driving force converted by the transducing device, $F_a$, $F_b$, $F_c$, $F_d$, $F_e$ are driving forces of a, b, c, d, and e, respectively, $S_d$ is the housing (d-plane) area, f is a viscous resistance formed by a small gap of the side wall, $f = \eta \Delta s$ (dv/dy), L is an equivalent load of the face when the vibration plate acts on the face, y is energy dissipated on an elastic element 2, $k_1$, $k_2$ are elastic coefficients of an elastic element 1 and the elastic element 2, respectively, is a fluid viscosity coefficient, dv/dy is a fluid velocity gradient, $\Delta s$ is a sectional area of an object (plate), A is the amplitude, $\Phi$ is an area of a sound field, $\Delta$ is a high-order quantity (derived from an incomplete symmetry of the shape of the housing). At any point outside the housing, a sound pressure generated by the vibration of the housing may be:

$$P_d = -j\omega\rho_0 \iint W_d(x'_d, y'_d) \cdot \frac{e^{jkR(x'_d, y'_d)}}{4\pi R(x'_d, y'_d)} dx'_d dy'_d \quad (15)$$

Wherein $R(x'_d, y'_d) = \sqrt{(x-x_d)^2 + (y-y_d)^2 + (z-z_d)^2}$ is the distance from the observation point $(x, y, z)$ to a point $(x'_d, y'_d, z_d)$ on the d-plane sound source.

$P_a$, $P_b$, $P_c$, $P_e$ are all functions of position. When a hole is opened at any position of the housing, and the area of the hole is S, the total effect of sound pressure at the hole is $\iint_{S_{opening}} P ds$.

Since the vibration panel 221 on the core housing 210 is closely attached to the human tissue, and its output energy may be absorbed by the human tissue, only the d-plane may push the air outside the housing to vibrate to form the leaked sound. The total effect of vibration of the air outside the housing pushed by the housing may be $\iint_{S_{housing}} P_d \, ds$.

In some application scenarios, our goal may be to make $\iint_{S_{opening}} P_d ds$ and $\iint_{S_{housing}} P_d ds$ equal in magnitude and opposite in direction, so as to achieve the effect of reducing the leaked sound, Once the basic structure of the device is determined, $\iint_{S_{housing}} P_d \, ds$ may be an amount that we can not adjust, $\iint_{S_{opening}} Pds$ may be adjusted to offset $\iint_{S_{housing}} P_d \, ds$. $\iint_{S_{opening}} Pds$ may include complete phase and amplitude information. The phase and amplitude may be closely related to the housing size of the speaker, the vibration frequency of the transducing device, the opening position, shape, count, size of the sound guiding hole(s), and whether there is a damping on the hole, which may allow us to implement the purpose of suppressing the leaked sound by adjusting the opening position, shape and count of sound guiding hole(s), and/or increasing damping and/or adjusting damping material.

The in-housing sound wave(s) and leaked sound wave(s) may be equivalent to two sound sources shown in the figure. The penetrating sound guiding hole(s) 230 may be opened on the wall surface of the housing in some embodiments of the present disclosure, which may guide the in-housing sound waves) to propagate to the outside of the housing, propagate in the air with the leaked sound waves(s), and interfere therewith, thereby reducing the amplitude of the leaked sound wave(s), that is, reducing the leaked sound. Therefore, the technical solution of the present disclosure, through the convenient improvement of opening sound guiding hole(s) in the housing, may solve the problem of the leaked sound to a certain extent without increasing the volume and weight of the speaker.

According to the equation derived by the inventor, those skilled in the art may easily understand that the elimination effect of leaked sound wave(s) may be closely related to the housing size of the speaker, the vibration frequency of the transducing device, the opening position, shape, count, and size of the sound guiding hole(s), and whether there is a damping on the hole, such that the opening position, shape, count, and the damping material of the sound guiding hole(s) may have a variety of different solutions according to needs.

Figure 26:
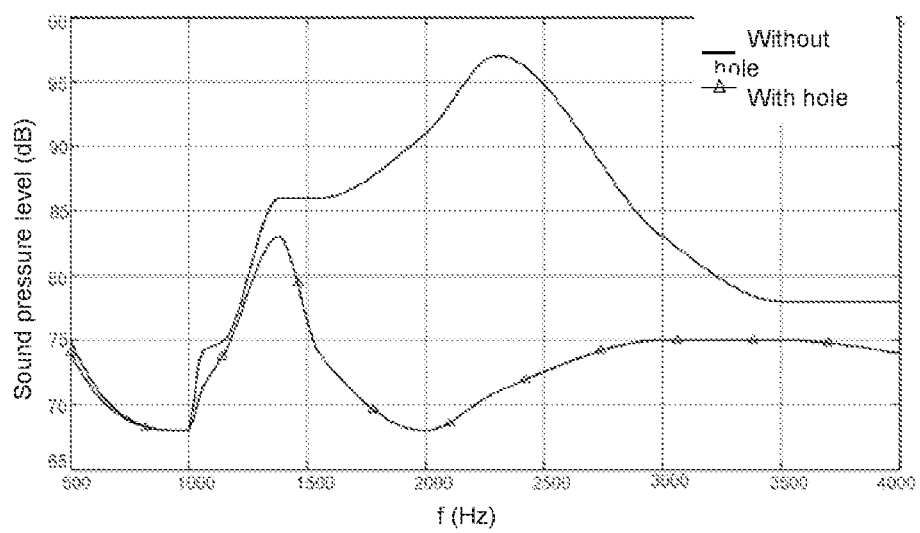
FIG. 26 is a schematic diagram illustrating an effect of suppressing leaked sound of a speaker in FIGS. 25A and 25B according to some embodiments of the present disclosure.

FIG. 26 is a diagram illustrating an effect of suppressing leaked sound of a speaker according to some embodiments of the present disclosure. In a target region near the speaker (e.g., the speaker shown in FIGS. 25A and 25B), a difference between a phase of a leaked sound wave transmitted to the target region and a phase of an in-housing sound wave propagating to the target region through sound guiding hole(s) may be close to 180 degrees. By doing this, the leaked sound wave generated by the housing may be significantly reduced or even eliminated in the target region.

As shown in FIG. 26, the leaked sound wave may be significantly suppressed in a frequency band from 1500 Hz to 4000 Hz. As used therein, within a frequency band from 1500 Hz to 3000 Hz, the suppressed leaked sound may basically exceed 10 dB. Especially within a frequency band from 2000 Hz to 2500 Hz, the leaked sound may be reduced by more than 20 dB after the sound guiding hole(s) is opened in an upper side of the housing compared with a case without opening the sound guiding hole(s).

It should be noted that the above description of the sound guiding hole of the glasses is only a specific example, and should not be regarded as the only feasible implementation solution. Obviously, for those skilled in the art, after understanding the basic principle of the sound guiding hole of the glasses, it may be possible to make various modifications and changes in the form and details of the specific method and operation of implementing the sound guiding hole of the glasses without departing from these principles, but these modifications and changes are still within the scope described above. For example, sizes of the sound guiding hole(s) 230 may be different to suppress leaked sound. All such variations may be within the protection scope of the present disclosure.

In some embodiments, as shown in FIG. 1, the function member 20 connected to the glasses frame may be a speaker 21. In some embodiments, the speaker 21 may include, but is not limited to an earphone, an MP3 player, a hearing-aid device, etc.

For the purpose of illustration only, a fitting position of the speaker on a human body may be further described below based on the bone conduction speaker. It should be noted that the contents described below may also be applied to an air conduction speaker without violating the principle.

In some embodiments, a position of the speaker with respect to the glasses temple 12 may be variable. Specially, the core housing 210 may be rotated to change a position of each speaker with respect to its connected glasses temple 12, so that the speaker may fit on different positions of a body. Since different parts transmit different vibrations, the user may feel different sound quality. In addition, it may be convenient for users with different head sizes. For example, the speaker shown in FIG. 1 may be fixed on the human ear through the glasses frame 10, and the speaker may be located behind the ear. In some embodiments, a connection end of the glasses temple 12 and the speaker may be set according to a habitual position of the user. For example, if the user is accustomed to placing the speaker 21 behind the ear, the earphone may be set behind the ear by adjusting the hinge component. As another example, the speaker 21 may be installed on the glasses temple or in the middle of the glasses frame. The connection manner between the glasses temple 12 and the speaker component 21 may be referred to the specific content elsewhere in the disclosure. It should be noted that the connection manner between the glasses temple 12 and the speaker 21 is not limited to the above description. For example, the glasses temple 12 and the speaker 21 may also be connected by clamping.

In some embodiments, the speaker 21 may fit on any position of the head of the user, for example, the top of the head, a forehead, a cheek, a temple, an auricle, the back of an auricle, etc. For example, a cross-head bracket may be set between the glasses temple 12 to reduce a support force of the glasses on the bridge of the nose, and the speak may be set on the bracket. In some embodiments, the bone conduction speaker may fit on the head in a plane-fitting or point-fitting manner. A gradient structure may be set on a fitting surface. The gradient structure refers to a region in which the surface of the contact surface has a change in height. The gradient structure may be a raised/sunken or stepped structure existing on the outside of the contact surface (the side fitting on the user), or a raised/sunken or stepped structure existing on the inside of the contact surface (the side facing away from the user).

It should be noted that the above description of the fitting position of the speaker 21 is only a specific example, and should not be regarded as the only feasible implementation solution. Obviously, for those skilled in the art, after understanding the basic principle of the sound guiding hole of the glasses, it may be possible to make various modifications and changes in the form and details of the specific method and operation of implementing the fitting without departing from these principles, but these modifications and changes are still within the scope described above. For example, a clamping position may be adjusted according to a fitting position of the speaker 21 and the human head. AH such variations may be within the protection scope of the present disclosure.

In a specific embodiment, referring to FIG. 1, FIG. 25A and FIG. 25B, the glasses may include the glasses rim 11 and the two glasses temple 12. The speaker 21 may be connected to the glasses temple 12 through a hinge component. In some embodiments, the structure of the speaker 21 may be shown in FIGS. 25A and 25B. The speaker may include a vibration unit and the transducing device 22. The vibration unit may include the core housing 210 and the vibration panel 221. The transducing device 22 (i.e., an earphone core) may be located inside and connected to the vibration unit. Preferably, the vibration unit may include the panel and the vibration transmission layer described above. A contact panel may be a surface of the vibration unit 1202 in contact with the user, preferably, an outer surface of the vibration transmission layer.

During a usage, the glasses temple 12 may fix the bone conduction speaker to a specific portion of the user (e.g., the head), and provide a clamping force between the vibration unit and the user. The contact panel may be connected to the transducing device 22 and keep contact with the user to transmit a sound to the user through vibration. If the bone conduction speaker has a symmetrical structure, and it is assumed that driving forces provided by two transducing devices 22 are equal and opposite to each other in the working process, a center point of the glasses rim 11 may be selected as an equivalent fixed end. If the bone conduction speaker is capable of providing stereoscopic sound, that is, immediate driving forces provided by the two transducing devices are unequal, or the bone conduction speaker has an asymmetric structure, other points or regions on the glasses may be selected as equivalent fixed ends. The fixed end used herein may be regarded as the equivalent end that a relatively fixed position of the bone conduction speaker in a vibration process. In some embodiments, physical quantities (e.g., a clamping force provided by the glasses temple, mass of the glasses temple, etc.) may be changed so as to change sound transmission efficiency of the bone conduction speaker and affect the frequency response of the system within a specific frequency range. The transmission efficiency may be related to a clamping force between the vibration unit and the user, which depends on physical properties of the glasses temple 12 and a hinge structure of the glasses temple 12. It should be noted that the clamping force of the glasses temple 12 may not only affect the efficiency of sound transmission, but also affect the feeling of the user in the bass frequency range. The clamping force mentioned herein may be a pressure between the contact panel and the user. Preferably, the clamping force may be between 0.1 N to 5 N. More preferably, the clamping force may be between 0.1 N to 4 N. Even more preferably, the clamping force may be between 0.2 N to 3 N. Even more preferably, the clamping force may be between 0.2 N to 1.5 N. Even more preferably, the clamping force may be between 0.3 N to 1.5 N.

Figure 27:
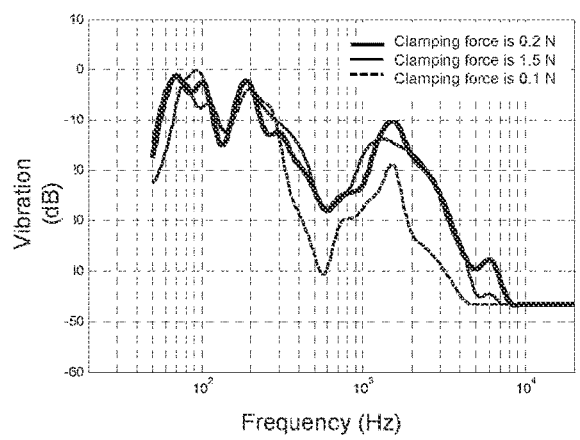
FIG. 27 is a schematic diagram illustrating a vibration response curve of a speaker under different pressures between a contact surface and a user according to some embodiments of the present disclosure.
Figure 28:
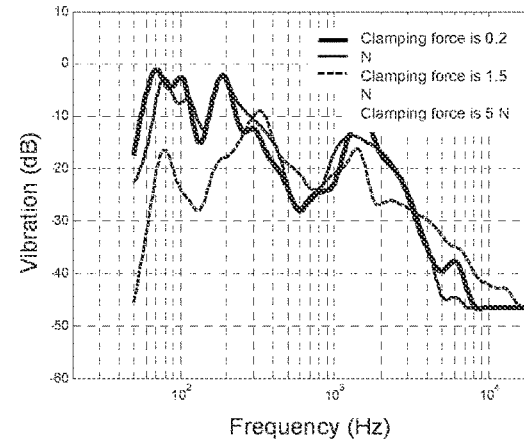
FIG. 28 is a schematic diagram illustrating a vibration response curve of a speaker under different pressures between a contact surface and a user according to some embodiments of the present disclosure.
Figure 29:
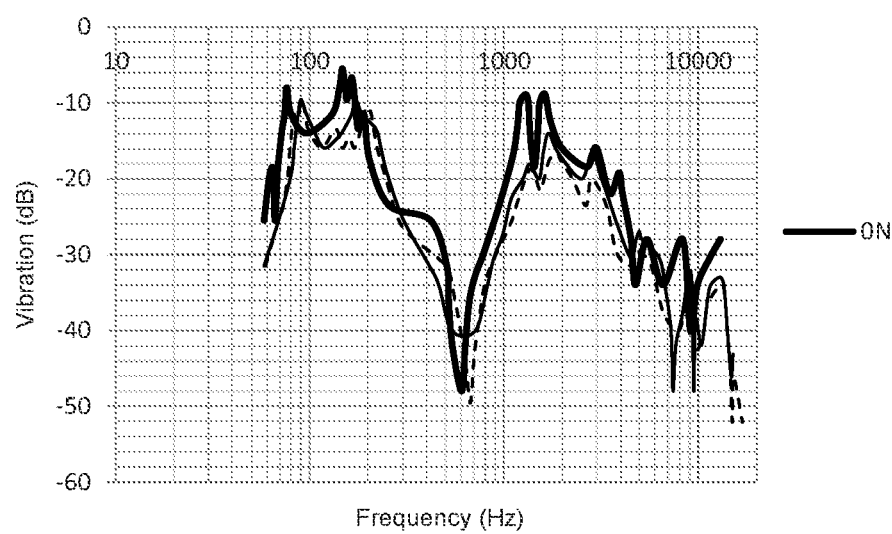
FIG. 29 is a schematic diagram illustrating a frequency response curve of a speaker under different clamping forces between a contact surface and a user according to some embodiments of the present disclosure.

The clamping force may provide pressure between a contact surface of the vibration generating portion of the bone conduction speaker and the user, FIG. 27 is a schematic diagram illustrating a vibration response curve of a bone conduction speaker under different pressures between a contact surface and a user according to some embodiments of the present disclosure. FIG. 28 is a schematic diagram illustrating a vibration response curve of a bone conduction speaker under different pressures between a contact surface and a user according to some embodiments of the present disclosure. In a process of vibration transmission, if a clamping force is lower than a certain threshold, it may not facilitate the transmission of high frequency vibration. As shown in (a), for the same vibration source (sound source), midrange-frequency and high-frequency portions of a vibration (sound) received by a wearer when the clamping force is 0.1 N may be significantly less than those of a received vibration (sound) when the clamping force is 0.2 N and 1.5 N. That is, with respect to sound quality, the performance of the midrange-frequency and high-frequency portions when the clamping force is 0.1 N may be weaker than the performance of those when the clamping force is between 0.2 N to 1.5 N. Similarly, in the process of vibration transmission, if the damping force is greater than a certain threshold, it may not facilitate the transmission of low-frequency vibration. As shown in (b), for the same vibration source (sound source), midrange-frequency and low-frequency portions of a vibration (sound) received by the wearer when the damping force is 5.0 N may be significantly less than those of a received vibration (sound) when the clamping force is 0.2 N and 1.5 N. That is, with respect to sound quality, the performance of the low-frequency portion when the clamping force is 5.0 N may be weaker than the performance of that when the clamping force is between 0.2 N to 1.5 N.

In a specific embodiment, a contact manner of the bone conduction speaker and the user may be designed such that the pressure between the contact surface and the user may be kept in a proper range. The pressure between the contact surface and the user may be greater than a certain threshold. Preferably, the threshold may be 0.1 N. More preferably, the threshold may be 0.2 N. More preferably, the threshold may be 0.3 N. Even more preferably, the threshold may be 0.5 N. The pressure between the contact surface and the user may be less than another threshold. Preferably, the threshold may be 5.0 N. More preferably, the threshold may be 4 N. Even more preferably, the threshold may be 3 N. Even more preferably, the threshold may be 1.5 N. After understanding the basic principle of the clamping force changing the frequency response of the bone conduction system, those skilled in the art may make various modifications and changes on the material and structure of the glasses temple 12 to determine clamping force range that satisfied different sound quality, but these modifications and changes are still within the scope described above.

It should be noted that the above description of the method of changing the clamping force of the bone conduction speaker is only a specific example, and should not be regarded as the only feasible implementation solution. Obviously, for those skilled in the art, after understanding the basic principle of the bone conduction speaker, it may be possible to make various modifications and changes in the manner of changing the clamping force of the bone conduction speaker with respect to the bone conduction speaker with different shapes and structures without departing from these principles, these modifications and changes are still within the scope described above. For example, the bone conduction speaker may be fixed on the head of the user through a material with a memory function (e.g., memory metal) and good elasticity. An opening radian of the bone conduction speaker may be adjusted according to the head shape of the user such that comfort of wearing may be improved to a greatest extent and the clamping force may be adjusted.

In some embodiments, the speaker described above may also transmit the sound to the user through air conduction. When the air condition is used to transmit the sound, the speaker may include one or more sound sources. The sound source may be located at a specific position of the user's head, for example, the top of the head, a forehead, a cheek, a temple, an auricle, the back of an auricle, etc., without blocking or covering an ear canal. For description purposes, FIG. 30 is a schematic diagram of transmitting sound transmitting through air conduction.

Figure 30:
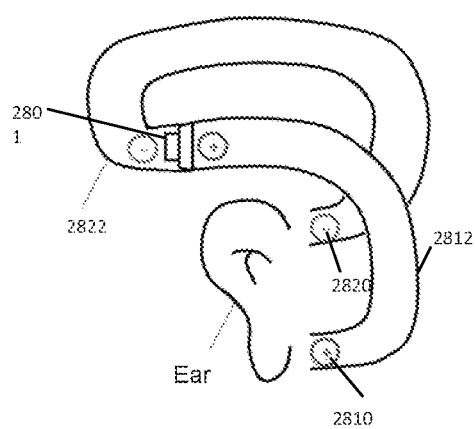
FIG. 30 is a schematic diagram of transmitting sound transmitting through air conduction according to some embodiments of the present disclosure.

As shown in FIG. 30, a sound source 2810 and a sound source 2820 may generate sound waves with opposite phases ("+" and "−" in the figure may indicate the opposite phases). For brevity, the sound sources mentioned herein may refer to sound outlets of the speaker that may output sounds. For example, the sound source 2810 and the sound source 2820 may be two sound outlets respectively located at specific positions of the speaker (e.g., the core housing 2219 in FIG. 20, or a circuit housing).

In some embodiments, the sound source 2810 and the sound source 2820 may be generated by the same vibration device 2801. The vibration device 2801 may include a diaphragm (not shown in the figure). When the diaphragm is driven to vibrate by an electric signal, the front side of the diaphragm may drive air to vibrate. The sound source 2810 may form at the sound output through a sound guiding channel 2812. The back of the diaphragm may drive air to vibrate, and the sound source 2820 may be formed at the sound output hole through a sound guiding channel 2822. The sound guiding channel may refer to a sound transmission route from the diaphragm to the corresponding outlet. In some embodiments, the sound guiding channel may be a route surrounded by a specific structure (e.g., the core housing 2219 in FIG. 20, or a circuit housing) on the speaker. It should to be known that in some alternative embodiments, the sound source 2810 and the sound source 2820 may also be generated by different vibrating diaphragms of different vibration devices, respectively.

Among the sounds generated by the sound source 2810 and the sound source 2820, one portion may be transmitted to the ear of the user to form the sound heard by the user. Another portion may be transmitted to the environment to form a leaked sound. Considering that the sound source 2810 and the sound source 2820 are relatively close to the ears of the user, for convenience of description, the sound transmitted to the ears of the user may be referred to as a near-field sound. The leaked sound transmitted to the environment may be referred to as a far-field sound. In some embodiments, the near-field/far-field sounds of different frequencies generated by the speaker may be related to a distance between the sound source 2810 and the sound source 2820. Generally speaking, the near-field sound generated by the speaker may increase as the distance between the two sound sources increases, while the generated far-field sound (the leaked sound) may increase with increasing the frequency.

For the sounds of different frequencies, the distance between the sound source 2810 and the sound source 2820 may be designed, respectively, so that a low-frequency near-field sound (e,g., a sound with a frequency of less than 800 Hz) generated by the speaker may be as large as possible and a high-frequency far-field sound (e.g., a sound with a frequency greater than 2000 Hz) may be as small as possible. In order to implement the above purpose, the speaker may include two or more sets of dual sound sources. Each set of the dual sound sources may include two sound sources similar to the sound source 2810 and the sound source 2820, and generate sounds with specific frequencies, respectively. Specifically, a first set of the dual sound sources may be used to generate low frequency sounds. A second set of the dual sound sources may be used to generate high frequency sounds. In order to obtain more low-frequency near-field sounds, the distance between two sound sources in the first set of the dual sound sources may be set to a larger value. Since the low-frequency signal has a longer wavelength, the larger distance between the two sound sources may not cause a large phase difference in the far-field, and not form excessive leaked sound in the far-field. In order to make the high-frequency far-field sound smaller, the distance between the two sound sources in the second set of the dual sound sources may be set to a smaller value. Since the high-frequency signal has a shorter wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

It should be noted that the above description of the sound conduction manner for changing the air conduction may be only a specific example, and should not be considered as the only feasible implementation. Obviously, for those skilled in the art, after understanding the basic principles of the air conduction, it may be possible to target air conduction speaker of different shapes and structures without departing from these principles, but these changes may still be within the scope of the above description. For example, the sound guiding channel 2822 may be disposed in the glasses according to other descriptions. All such variations are within the protection scope of the present disclosure.

The beneficial effects of the embodiments of the present disclosure may include but be not limited to the following. (1) When a state of the hinge is switched by a push of the connection through the hinge component, the hinge may change abruptly, thereby providing convenience for users. (2) The sound guiding hole may reduce the vibration of the housing and suppress the leaked sound. (3) The composite vibration device may improve the sound quality of the speaker. It should be noted that different embodiments may have different beneficial effects. In different embodiments, the possible beneficial effects may be any one or a combination of the above, and may be any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

A computer-readable signal medium may include a propagated data signal with computer-readable program code embodied therein, for example, in baseband or as portion of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In closing, it is to be understood that the embodiments of the application disclosed herein are illustrative of the principles of the embodiments of the application. Other modifications that may be employed may be within the scope of the application, Thus, by way of example, but not of limitation, alternative configurations of the embodiments of the application may be utilized in accordance with the teachings herein. Accordingly, embodiments of the present application are not limited to that precisely as shown and described.

What is claimed is:

1. A glasses, comprising:
 a glasses frame, the glasses frame comprising a glasses rim and two glasses temples, and the two glasses temples being rotatably connected to the glasses rim, respectively; and
 two speakers, the two speakers comprising an earphone core, respectively, the two speakers being connected to the two glasses temples via hinge components of the two glasses temples, respectively, the hinge components being rotatable to change a position of each of the two speakers relative to connected one of the two glasses temples to make the speaker abut in front of or behind a user's ear, without blocking or covering an ear canal, wherein
  the glasses temple accommodates a control circuit or a battery to drive the earphone core to vibrate to generate a sound, wherein the glasses further include an earphone housing for accommodating the earphone core, the earphone core at least includes a composite vibration device constituted by a vibration plate and a second vibration transmission plate, and the composite vibration device generates two formants.

2. The glasses of claim 1, wherein the hinge component includes a hinge, a rod-shaped member, and a fixing member, and the hinge includes:
 a hinge mount;
 a hinge arm rotatably connected to the hinge mount via a rotating shaft, and being rotatable relative to the hinge mount when an external force is applied to the hinge arm to change the position of the speaker relative to the glasses temple;
 a support member flexibly disposed on the hinge mount; and
 an elastic member configured to elastically offset the support member toward the hinge arm, so that the support member elastically abuts on the hinge arm.

3. The glasses of claim 2, wherein
 the hinge arm includes a first support surface and a second support surface connected to each other;
 the support member includes a third support surface;
 when the elastic member elastically offsets the support member toward the hinge arm, the third support surface elastically abuts on the first support surface and the second support surface, respectively; and
 when the hinge arm is rotated relative to the hinge mount by the external force, a connection between the first support surface and the second support surface drives the support member against the elastic offset of the elastic member to move in an opposite direction, so that the third support surface is switched from being elastically abutting on one of the first support surface and the second support surface to being elastically abutting on the other of the first support surface and the second support surface.

4. The glasses of claim 3, wherein a ratio between a maximum distance from the rotating shaft to the connection and a shortest distance from the rotating shaft to the first support surface is between 1.1 and 1.5 in a section perpendicular to a central axis of the rotating shaft.

5. The glasses of claim 3, wherein an included angle between the hinge mount and the hinge arm becomes smaller when the third support surface is switched from elastically abutting on the first support surface to elastically abutting on the second support surface.

6. The glasses of claim 3, wherein an external force required when the third support surface is switched from elastically abutting on the first support surface to elastically abutting on the second support surface is different from an external force required when the third support surface is switched from elastically abutting on the second support surface to elastically abutting on the first support surface.

7. The glasses of claim 3, wherein the connection has an arc shape in a section perpendicular to a central axis of the rotating shaft (33).

8. The glasses of claim 7, wherein the connection has a circular arc shape, and a curvature of the circular arc is between 5 and 30.

9. The glasses of claim 3, wherein an included angle between the first support surface and the second support surface is an obtuse angle in a section perpendicular to a central axis of the rotating shaft.

10. The glasses of claim 3, wherein
the hinge mount includes a mount body, and a first lug and a second lug protruding from the mount body and spaced from each other; and
the hinge arm includes an arm body and a third lug protruding from the arm body, the third lug is inserted into an interval region between the first lug and the second lug, and rotatably connected to the first lug and the second lug via the rotating shaft.

11. The glasses of claim 10, wherein
the support member is at least partially disposed inside the interval region and located at a side of the third lug towards the mount body; and
the mount body is disposed with an accommodation chamber communicating with the interval region, the elastic member is disposed inside the accommodation chamber, and the support member elastically offsets toward the third lug.

12. The glasses of claim 1, wherein the earphone core further includes at least one voice coil and at least one magnetic circuit system, the voice coil is physically connected to the vibration plate, the magnetic circuit system is physically connected to the second vibration transmission plate.

13. The glasses of claim 1, wherein a stiffness coefficient of the vibration plate is greater than a stiffness coefficient of the second vibration transmission plate.

14. The glasses of claim 1, wherein
the earphone core further comprises a first vibration transmission plate;
the first vibration transmission plate is physically connected to the composite vibration device;
the first vibration transmission plate is physically connected to the earphone housing; and
the first vibration transmission plate generates another formant.

15. The glasses of claim 14, wherein frequencies of the two formants are both within a frequency range of sounds audible to human ears.

16. The glasses of claim 1, wherein
at least a portion of the earphone housing is disposed with at least one sound guiding hole;
the at least one sound guiding hole derives a sound wave inside the earphone housing; and
the sound wave superimposes with a leaked sound wave generated by vibration of the earphone housing to reduce a leaked sound.

17. The glasses of claim 1, wherein the speaker at least comprises a contact surface in direct or indirect contact with a user;
a pressure between the contact surface and the user is greater than 0.1 N; or
the pressure between the contact surface and the user is smaller than 5 N.

18. The glasses of claim 17, wherein a material of the glasses frame includes a memory alloy or an engineering plastic material.

19. The glasses of claim 17, wherein a frequency response curve of the speaker is a superposition of a frequency response curve of each point on the contact surface.

\* \* \* \* \*